United States Patent
Ichikawa et al.

(10) Patent No.: US 6,656,564 B2
(45) Date of Patent: Dec. 2, 2003

(54) CERAMIC HONEYCOMB STRUCTURE

(75) Inventors: Yukihito Ichikawa, Nagoya (JP); Takahiro Kondo, Nagoya (JP); Makoto Miyazaki, Nagoya (JP); Masahiro Shirai, Komaki (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 10/089,692

(22) PCT Filed: Aug. 1, 2001

(86) PCT No.: PCT/JP01/06632
§ 371 (c)(1),
(2), (4) Date: Apr. 23, 2002

(87) PCT Pub. No.: WO02/11884
PCT Pub. Date: Feb. 14, 2002

(65) Prior Publication Data
US 2002/0192426 A1 Dec. 19, 2002

(30) Foreign Application Priority Data
Aug. 3, 2000 (JP) .......................... 2000-236122

(51) Int. Cl.⁷ .................................. B32B 3/12
(52) U.S. Cl. ................ 428/116; 428/18; 55/523; 502/34; 502/527.19; 422/180; 422/222
(58) Field of Search ..................... 428/116, 118; 55/523; 502/34, 527.19; 422/180, 177, 211, 222

(56) References Cited

U.S. PATENT DOCUMENTS 4,233,351 A 11/1980 Okumura et al.
5,952,079 A * 9/1999 Andou et al.
6,060,148 A * 5/2000 Matsubara et al.

FOREIGN PATENT DOCUMENTS

| EP | 0 867 222 A2 | 9/1998 |
| JP | 54-110189 | 8/1979 |
| JP | 11-277653 | 10/1999 |

* cited by examiner

Primary Examiner—John J. Zimmerman
Assistant Examiner—Wendy Boss
(74) Attorney, Agent, or Firm—Parkhurst & Wendel, L.L.P.

(57) ABSTRACT

A ceramic honeycomb structure (1) constituted by cell walls (ribs) (2) forming a composite structure from a plurality of cells (3) being adjacent each other and a honeycomb outer wall (4) surrounding and holding the outermost peripheral cells located at the circumference of the composite structure; said composite structure satisfying the followings:

the basic thickness of the cell walls (2) (the basic cell wall thickness) (Tc) is $Tc \leq 0.12$ mm, the outer wall thickness (Ts) of the honeycomb structure is $Ts \geq 0.05$ mm, and the open frontal area (P) is $P \geq 80\%$, and there is a relation shown by formula:

$$1.10 \leq (Tr_1 \sim Tr_{3-20})/Tc \leq 3.00$$

between the basic cell wall thickness (Tc) and each cell wall thickness ($Tr_1 \sim Tr_{3-20}$) of cells existing between an outermost peripheral cell and any cell within a first end cell from a third cell to a twentieth cell extending inwardly, taking the outermost peripheral cell as a first starting cell.

19 Claims, 16 Drawing Sheets

CERAMIC HONEYCOMB STRUCTURE

The present invention relates to a ceramic honeycomb structure. More particularly, the present invention relates to a ceramic honeycomb structure capable of balancing the disadvantages incurred by the increased pressure loss and the decreased thermal shock resistance against the advantages brought about by the increased isostatic strength and the cell wall shape and honeycomb external shape of higher accuracy, and which is suitably used, for example, as a carrier for catalyst for automobile exhaust gas purification. The ceramic honeycomb structure of the present invention is also used suitably as a filter for diesel particulates or the like, as a chemical reactor (e.g. a catalyst carrier for fuel cell reformer), or as a heat exchanger.

BACKGROUND ART

As catalysts for purification of automobile exhaust gas, there are used so-called honeycomb catalysts wherein a catalyst component is loaded on the surfaces of the cell walls of a ceramic honeycomb carrier (honeycomb structure). In these catalysts, since the axial direction strength of the honeycomb carrier is higher than its strength in the sectional (diameter) direction, the honeycomb carrier was held in the axial direction. In this holding manner, in order to prevent the breakage of the honeycomb carrier occurring at around the periphery of its ends in axial direction holding, the thickness of the cell walls (ribs) near the circumference of the honeycomb carrier was made larger than the thickness of the cell walls in the inner portion of the honeycomb carrier to increase the anti-pressure strength of the honeycomb carrier in the axial direction.

Recently, however, the higher output adopted in engines has required a lower pressure loss of honeycomb catalyst and the stricter regulation employed for exhaust gas has needed the effective utilization of whole catalyst carrier; therefore, it has been started to hold the honeycomb carrier mainly at its outer surface, in place of holding in the axial direction. Another reason for this is that the stricter regulation for exhaust gas has invited a larger catalyst volume and an increased catalyst mass and, as a result, the holding in the axial direction has become unable to give a sufficient holding area and promise sufficient holding relative to engine vibration.

Meanwhile, in order to enhance the purification ability of catalyst, it has been started to make thinner the thickness of the cell walls of a honeycomb carrier and decrease the weight of the honeycomb carrier and thereby reduce the heat capacity of a catalyst and enhance its purification ability (warm-up property).

The above use of cell walls of thinner thickness tends to result in a lower fracture strength against the external pressure which the honeycomb carrier receives at the outer surface.

In order to meet the recent even stricter regulation for exhaust gas, it has been aimed to improve the conditions of engine combustion and the purification ability of catalyst. As a result, the temperature of exhaust gas has become higher year by year and the thermal shock resistance required for a honeycomb carrier has become stricter.

Thus, due to the thinning of the cell walls, the employment of holding honeycomb carrier at the outer surface, the increase in temperature of exhaust gas and the like, the setting of cell wall thickness and honeycomb outer wall thickness, the increase in the isostatic strength of honeycomb structure, and the higher accuracies of honeycomb external shape and cell wall shape have become important tasks to be achieved.

In connection with the above, there was proposed, in JP-A-54-110189, a honeycomb carrier structure whose cell walls are made thinner at a given ratio from the outermost peripheral cell wall towards the center of the cross-section. In this structure, since use of a thin wall in the entire honeycomb carrier is impossible, the total mass of the honeycomb carrier is inevitably large, posing a problem in the warm-up property of the honeycomb carrier. This structure is undesirable also in pressure loss.

There was also proposed, in JP-A-54-150406 and JP-A-55-147154, a structure wherein the walls of the cells near the circumference of the structure are made thicker than those of the inner cells. However, no mention is made on the thickness of the outer wall or on the specific relation between different cell wall thickness therein.

In these honeycomb structures of the prior art, since the thickness of inner cell walls is as large as 0.15 mm or more and the holding is made in the axial direction, the thickness of the honeycomb outer wall was not a problem. One may merely point out that too large an outer wall thickness gives a low thermal shock resistance, if forced to do so.

Further in WO 98/05602 was proposed a ceramic honeycomb structure wherein the average cell wall thickness T is 0.05 to 0.13 mm, the average outer wall thickness is larger than T, W>T (W is an average width of contact between cell wall and outer wall), and $0.7 \geq -(T/4)+0.18$.

This ceramic honeycomb structure exhibits some effect in prevention of peripheral chipping during handling; however, it was not fully satisfactory in increased pressure loss, reduced thermal shock resistance, increase in isostatic strength, and the improvements in the accuracies of cell wall shape and honeycomb structure external shape.

No in-depth investigation has hitherto been made particularly on the improvements in the accuracies of cell wall shape and honeycomb structure external shape. That is, a ceramic honeycomb structure is generally molded by extruding, for example, a cordierite raw material for ceramic through a die having lattice-shaped slits; then dried; and fired to become a product. When a smaller cell wall thickness is employed, the cell walls tend to deform during molding, owing to the cause mentioned later and resultantly the fired material obtained showed no satisfactory isostatic strength while this did not happen when the cell wall thickness was as large as 0.15 mm or more. Nevertheless, no sufficient investigation has been made. The deformed cell walls are destroyed at the deformed sites by a small force. That is, when cell walls do not deform and are molded at a high accuracy, they theoretically become sites of compression stress when a pressure is applied to the outer surface of honeycomb structure, and the destruction of honeycomb structure takes place owing to the buckling of cell wall or outer wall. Meanwhile, when cell walls have deformed, a bending stress (a stress in tensile direction) is generated at the deformed sites, resulting in easy destruction. In general, materials are less resistant to tensile strength than to compression stress and, in ceramic materials, in particular, the ratio (about 1/10) of tensile strength to compression strength is very small as compared with that (about 1/3) of metal materials. Therefore, when there is deformation of cell walls, destruction takes place at a strength considerably lower than a strength at which destruction takes place ordinarily.

The present invention has bee made in view of the above problems, and aims at providing a ceramic honeycomb structure capable of balancing the disadvantages incurred by the increased pressure loss and the decreased thermal shock resistance against the advantages brought about by the increased isostatic strength and the cell wall shape and honeycomb external shape of higher accuracy, and which is suitable particularly as, for example, a carrier for catalyst for automobile exhaust gas purification.

DISCLOSURE OF THE INVENTION

In order to achieve the above object, the present inventor made a study including various tests mentioned later, with considering the thinner cell walls recently employed in honeycomb carriers. As a result, the following was found out. That is, the adoption of a thick wall only in the cells near the circumference of honeycomb structure as seen in the prior art is insufficient and attention must be paid also to the extrudability of honeycomb structure; therefore, the designing of a honeycomb structure need be made while paying attention not only to the relation between the wall thickness of each outermost peripheral cell and the wall thickness of inner cells (basic cells), i.e. the basic cell wall thickness, but also, while considering the basic cell wall thickness and the thickness of honeycomb outer wall, to the relation between the basic cell wall thickness and the wall thickness of the cells existing between the outermost peripheral cell taken as starting cell and any cell taken as end cell of a certain number of cells extending inwardly from the starting cell and located near the circumference of honeycomb structure; by making the designing of a honeycomb structure as above, the above-mentioned aim of the present invention can be achieved. The present invention has been completed based on the above finding.

It has heretofore been believed that a honeycomb structure having a high strength against a pressure applied to the outer surface can be obtained by allowing the honeycomb structure to have an increased outer wall thickness. There were produced cordierite-made thin wall honeycomb structure samples having an outer diameter of 90 mm, a length of 110 mm, a square cell shape, a cell wall thickness of 0.11 mm and a cell density of $9.3 \times 10^5$ cells/m$^2$ (wall-to-wall distance: 1.04 mm), with varying the outer wall thickness between 0.1 and 0.9 mm; and they were measured for isostatic strength and the results are shown in FIG. 5. As shown in FIG. 5, the isostatic strength showed no increase and reversely decreased, even if the outer wall thickness was made thicker than 0.4 mm.

The reason for the fact that mere increase in outer wall thickness gives no increase in isostatic strength, is considered to be that as the outer wall thickness is increased, the amount of shape deformation of the wall (rib) of the cells near the circumference of honeycomb structure increases and moreover the number of the deformed walls increases. This is considered to be because as the outer wall thickness is increased, the amount of the raw material passing, during extrusion molding, through the die slit for outer wall formation increases and, as a result, the ribs of the cells near the circumference of honeycomb structure are dragged toward the outer wall and the raw material flow in outer wall and the raw material flow in ribs become unbalanced. The main reasons therefor are considered to be that the change of ribs to smaller thickness incurs easy buckling deformation and that, when the honeycomb structure after extrusion molding is fixed by a jig at the outer surface, the honeycomb structure per se deforms owing to the own weight and, as a result, deformation of the outer wall and the inside ribs, particularly the ribs near the circumference of honeycomb structure takes place. This tendency is considered to be higher as the ribs are thinner and the structure is bigger.

According to strength of materials, buckling strength is basically proportional to the square of cell wall (rib) thickness, as shown by the following formula. It is appreciated from the formula that the thickness of cell wall has a great influence on the strength of honeycomb carrier.

Buckling strength=$(k\pi^2 E) \times (t/L)^2$ wherein k is a coefficient, E is a Young's modulus, L is a cell wall length, and t is a cell wall thickness.

Also, there was conducted a test for thermal shock resistance in supercooling, wherein a honeycomb carrier having a cell wall thickness of 0.11 mm was heated in an electric furnace for a given length of time to make the temperature uniform and then taken out from the furnace. The results are shown in FIG. 6. As the outer wall thickness of the honeycomb carrier was increased, the thermal shock resistance decreased and the decrease was larger when the outer wall thickness was 0.7 mm or more. This is considered to be that as the outer wall is thicker, the outer wall per se has a larger heat capacity and the temperature difference between inside and outside the outer wall is bigger.

For lowering the heat capacity of outer wall, there is an idea of forming notches in the outer wall, as seen in the above-mentioned JP-A-54-150406. This idea has a meaning if the outer wall is sufficiently thick; however, when the cell wall thickness is very thin (1.12 mm or less), the outer wall cannot be freely made thicker as mentioned previously and resultantly the effect of notches is small. Conversely, there is a risk of decreasing the rigidity of the outer wall.

Also, strength was measured in honeycomb carriers wherein the wall thickness in the cells near the circumference of the carriers were made larger than the inner cell (basic cell) wall thickness as in the prior art. As a result, there was certainly an increase in strength; however, as the wall thickness in the cells near the circumference of the carriers was too large, the strength tended to decrease. Inspection of a carrier having a considerably large wall thickness in the outermost peripheral cell indicated that the cell wall of the outermost peripheral cell had deformation. The reason is considered to be the same as the reason for the above-mentioned fact that mere increase in outer wall thickness gives no increase in isostatic strength. As in the case of mere increase in outer wall thickness, mere increase in the wall thickness in the cells near the circumference of carrier does not necessarily contribute to the increase in isostatic strength.

FIG. 7 shows the results obtained when each cell wall thickness of the cells existing between each outermost peripheral cell taken as a starting cell and any cell of the 2nd to 20th cells extending inwardly from the starting cell was increased from the basic cell wall thickness (75 $\mu$m) to 100 $\mu$m, 150 $\mu$m or 200 $\mu$m and each of the resulting honeycomb structures was measured for isostatic strength (%). As can be taken from FIG. 7, the degree of increase in isostatic strength was low when the wall thickness of the first to 4th cells was made larger; a striking increase in isostatic strength was seen when the wall thickness of each cell from any of the 5th to 15th cells was made larger; and there was observed the settlement in the degree of increase in isostatic strength even if the wall thickness of the 5th to 20th cells was made larger. No increase in isostatic strength was seen when the wall thickness of the 1st to 2nd cells was made larger; however, a sign of increase was seen when the wall thickness of the 1st to 3rd or 4th cells was made larger; and a clear increase was seen when the wall thickness of 5th or later cells was made larger.

Strength measurement was also made by changing the dimension of external shape of honeycomb structure. In a honeycomb structure having a circular section of 144 mm or more in diameter or having an elliptical section having the same sectional area as the circular section, an increase in strength was seen when the wall thickness of each cell of the 10th to 30th cells was made larger; and there was observed in a similar tendency to that mentioned above in the degree of increase in strength when the wall thickness of the 10th to 40th cells was made larger. (This was the same tendency as seen above.)

FIG. 8 shows the results obtained when each cell wall thickness ($Tr_1$~$Tr_{13}$) of the outermost peripheral cell, taken as a starting cell to the 13th cell was made larger one by one than the basic cell wall thickness (Tc) so as to give a ratio of 1.00 to 3.00 in terms of $[(Tr_1$~$Tr_{13})/(Tc)]$ and measurement of isostatic strength (%) was made. As seen from FIG. 8, a sharp increase in isostatic strength was seen from when the ratio of said each cell wall thickness to basic cell wall thickness, i.e. $[(Tr_1$~$Tr_{13})/(Tc)]$ was 1.10; and the degree of the increase settled when the $[(Tr_1$~$Tr_{13})/(Tc)]$ was 2.5.

FIG. 9 is a partly enlarged view of FIG. 8. As seen from FIG. 9, since the sharp increase in isostatic strength lasts to $[(Tr_1$~$Tr_{13})/(Tc)]$ =1.20, it is preferred to adopt a $[(Tr_1$~$Tr_{13})/(Tc)]$ of 1.20 or more.

FIG. 10 shows the results obtained when each cell wall thickness ($Tr_1$—$Tr_{13}$) of the 1st cell (taken as starting cell) to the 13th cell was made larger one by one than the basic cell wall thickness (Tc) so as to give a ratio of 1.00 to 3.00 in terms of $[(Tr_1$~$Tr_{13})/(Tc)]$ and measurement of pressure loss (%) was made. As seen from FIG. 10, a sharp increase was seen from when the $[(Tr_1$~$Tr_{13})/(Tc)]$ was 3.00; therefore, it is preferred to adopt ordinarily a $[(Tr_1$~$Tr_{13})/(Tc)]$ of 3.00 or less and, from practical viewpoints, a $[(Tr_1$~$Tr_{13})/(Tc)]$ of 2.50 or less, preferably 1.60 or less.

FIG. 11 shows the results obtained when each cell wall thickness ($Tr_1$~$Tr_{15}$) of the outermost peripheral cell taken as a starting cell to the 15th cell was made thicker than the basic cell wall thickness (Tc) so as to give a ratio of 2.0 in terms of $[(Tr_1$~$Tr_{15})/(Tc)]$ and measurement of pressure loss (%) was made (case 1); when, in addition to the conditions of the case 1, each cell wall of the 16th to 20th cells was allowed to have a sectional shape of an inverse trapezoid (the minor base was present inwardly), the thickness of said each cell wall was made thinner as said each cell wall was located more inwardly, and the thinnest wall thickness was made identical to the basic cell wall thickness (Tc) (case 2); when, in addition to the conditions of the case 1, each cell wall of the 16th to 20th cells was allowed to have a sectional shape of a spool, the thickness of said each cell wall was made thinner as said each cell wall was located more inwardly, and the thinnest wall thickness was made identical to the basic cell wall thickness (Tc) (case 3); when the ratio of the outermost peripheral cell wall thickness ($Tr_1$) to the basic cell wall thickness (Tc) was set at 2.0, each cell wall of the 2nd and later cells was allowed to have a sectional shape of an inverse trapezoid (the minor base was present inwardly), the thickness of said each cell wall was made thinner as said each cell wall was located more inwardly, the smallest wall thickness was made identical to the basic cell wall thickness, and measurement of pressure loss (%) was made (case 4); and when the ratio of the outermost peripheral cell wall thickness ($Tr_1$) to the basic cell wall thickness (Tc) was set at 2.0, each cell wall of the 2nd and later cells was allowed to have a sectional shape of a spool, the thickness of said each cell wall was made smaller as said each cell wall was located more inwardly, the thinnest wall thickness was made identical to the basic cell wall thickness, and measurement of pressure loss (%) was made (case 5). As seen from FIG. 11, pressure loss is large in the cases 1 to 3; therefore, when increase in pressure loss is a disadvantage, it is preferred to make gradually smaller the cell wall thickness from the outermost peripheral cell toward inner cells as in the cases 4 and 5.

FIG. 12 shows the results obtained when, in the cases of FIG. 11, thermal shock resistance (%) was measured in place of pressure loss. As seen from FIG. 12, when the cell wall thickness was made gradually smaller from the predetermined cell to a particular inner cell as in the cases 2 to 5, an increase in thermal shock resistance can be obtained as compared with the case 1.

FIG. 13 shows the results obtained when pressure loss (%) was measured by setting, at 2.0, the ratio of each cell wall thickness ($Tr_1$~$Tr_{30}$) of the cells existing between the outermost peripheral cell taken as a starting cell and any cell extending therefrom to the 30th cell, to the basic cell wall thickness (Tc), i.e. $[(Tr_1$~$Tr_{30})/(Tc)]$. As seen from FIG. 13, pressure loss increases from when the number of cells of thickened wall exceeds 20.

FIG. 14 shows the results obtained when external shape accuracy (mm) was measured by setting one by one, at 1.6, the ratio of each cell wall thickness ($Tr_1$~$Tr_{20}$) of the cells existing between the outermost peripheral cell taken as a starting cell and any cell extending therefrom to the 20th cell, to the basic cell wall thickness (Tc), i.e. $[(Tr_1$~$Tr_{20})/(Tc)]$. As seen from FIG. 14, external shape accuracy (dimensional accuracy) increases from when the number of cells of thickened wall exceeds 5 and, when the cell walls of up to the 15th cells are made thicker, the dimensional accuracy is half of when the cell wall thickness is constant and the same as the basic cell wall thickness. The reason is considered to be that the thicker wall thickness adopted in the cells near the circumference of honeycomb structure increased the rigidity of the structure and the deformation occurring from structure molding to its firing was suppressed. It is considered that this also contributes to the improvement in the uniform molding.

Based on the results of the above study, there is provided the following ceramic honeycomb structure according to the present invention.

1A ceramic honeycomb structure (1) constituted by cell walls (ribs) (2) forming a composite structure from a plurality of cells (3) being adjacent each other and a honeycomb outer wall (4) surrounding and holding the outermost peripheral cells located at the circumference of the composite structure;

characterized in that a basic thickness of cell walls (2) (the basic cell wall thickness) (Tc) is Tc≦0.12 mm, an outer wall thickness (Ts) of the honeycomb structure is Ts≧0.05 mm, and an open frontal area (P) is P≧80%, and there is a relation shown by a formula:

$$1.10 \leq (Tr_1 \sim Tr_{3-20})/Tc \leq 3.00$$

between the basic cell wall thickness (Tc) and each cell wall thickness ($Tr_1$~$Tr_{3-20}$) of cells existing between an outermost peripheral cell and any cell within a first end cell from a third cell to a twentieth cell extending inwardly, taking the outermost peripheral cell as a first starting cell.

[2] A ceramic honeycomb structure according to the above [1] wherein there is a relation shown by a formula:

$$1.10 \leq (Tr_1 \sim Tr_{3-15})/Tc \leq 3.00$$

between the basic cell wall thickness (Tc) and each cell wall thickness ($Tr_1$~$Tr_{3-15}$) of cells existing between an outermost peripheral cell and any cell within a first end cell from a third cell to a fifteenth cell extending inwardly, taking the outermost peripheral cell as a first starting cell.

[3] A ceramic honeycomb structure according to the above [1] or [2], wherein any cell within a second end cell from a third cell to a fifth cell extending inwardly, taking a cell adjacent to the first end cell but located inward therefrom as a second starting cell, has such a cell wall thickness that a section of said each cell wall has a rectangular shape whose minor side of rectangle is a cell wall thickness thereof when the honeycomb structure is cut by a plane perpendicular to the direction of the cells (passages), and a cell wall thickness having a shortest minor side is identical to the basic cell wall thickness (Tc), by shortening a minor side thereof one by one as a cell is located more inwardly.

[4] A ceramic honeycomb structure according to the above [1] or [2], wherein any cell within a second end cell from a third cell to a fifth cell extending inwardly, taking a cell adjacent to the first end cell but located inward therefrom as a second starting cell, has such a cell wall thickness that a section of said each cell wall has such an inverse trapezoidal shape as a minor base of inverse trapezoid is a thickness of said each cell wall when the honeycomb structure is cut by a plane perpendicular to the direction of the cells (passages), and a thickness of a cell wall having a shortest minor base is identical to the basic cell wall thickness (Tc), by shortening a minor base of inverse trapezoid thereof one by one as said each cell wall is located more inwardly.

[5] A ceramic honeycomb structure according to the above [1] or [2], wherein any cell within a second end cell from a third cell to a fifth cell extending inwardly, taking a cell adjacent to the first end cell but located inward therefrom as a second starting cell, has such a cell wall thickness that a section of said each cell wall has such a spool shape as an inner side of spool is shorter than an outer side when the honeycomb structure is cut by a plane perpendicular to the direction of the cells (passages), and a thickness of a cell wall having an shortest inner side is identical to the basic cell wall thickness (Tc), by shortening inner side of spool thereof one by one as said each cell wall is located more inwardly.

[6] A ceramic honeycomb structure according to the above [1], wherein there is a relation shown by a formula $$1.10 \leq Tr_1/Tc \leq 3.00$$

between the cell wall thickness ($Tr_1$) of each outermost peripheral cell and the basic cell wall thickness (Tc), there is a relation shown by a formula $$1.10 \leq (Tr_1 \sim Tr_{3\text{-}20})/Tc \leq 3.00$$

between the basic cell wall thickness (Tc) and each cell wall thickness ($Tr_1 \sim Tr_{3\text{-}20}$) within a third end cell from a third cell to a twentieth cell extending inwardly, taking the outermost peripheral cell as a first starting cell, a section of said each cell wall has such a rectangular shape as a minor side thereof is thickness of said each cell wall, or such an inverse trapezoidal shape as a minor base of inverse trapezoid is present inwardly and is thickness of said each cell wall, or such a spool shape as inner side of spool is shorter than outer side when the honeycomb structure is cut by a plane perpendicular to the direction of the cells (passages); and a thickness of the cell wall having a shortest minor side, or a shortest minor base or a shortest inner side is identical to the basic cell wall thickness (Tc), by shortening the minor side of rectangle, or the inward minor base of inverse trapezoid or the inner side of spool one by one as said each cell wall is located more inwardly.

[7] A ceramic honeycomb structure according to any of the above [1] to [6], wherein there is the following relation $$1.10 \leq (Tr_1 \sim Tr_{3\text{-}20})/Tc \leq 2.50$$

between the basic cell wall thickness (Tc) and said each cell wall thickness ($Tr_1 \sim Tr_{3\text{-}20}$).

[8] A ceramic honeycomb structure according to any of the above [1] to [6], wherein there is the following relation $$1.20 \leq (Tr_1 \sim Tr_{3\text{-}20})/Tc \geq 1.60$$

between the basic cell wall thickness (Tc) and said each cell wall thickness ($Tr_1 \sim Tr_{3\text{-}20}$).

[9] A ceramic honeycomb structure according to any of the above [1] to [8], wherein the cells have a sectional shape of a triangle or a higher polygon.

[10] A ceramic honeycomb structure according to any of the above [1] to [9], wherein the honeycomb outer wall has a sectional shape of a circle, an ellipse, a trapezoid, a triangle, a tetragon, a hexagon or a special shape whose left and right are asymmetrical to each other.

[11] A ceramic honeycomb structure according to any of the above [1] to [10], wherein the honeycomb outer wall has a diameter of 144 mm or more when it has a circular sectional shape and, when it has a sectional shape other than a circular sectional shape, it has a sectional area equal to when it has a circular sectional shape, and, there is the following relation $$1.10 \leq (Tr_1 \sim Tr_{10\text{-}40})/Tc \leq 3.00$$

between the basic cell wall thickness (Tc) and each cell wall thickness ($Tr_1 \sim Tr_{10\text{-}40}$) of cells existing within a first end cell from a third cell to a fortieth cell extending inwardly, taking the outermost peripheral cell as a first starting cell.

[12] A ceramic honeycomb structure according to any of the above [1] to [10], wherein the honeycomb outer wall has a diameter of 144 mm or more when it has a circular sectional shape and, when it has other than a circular sectional shape, it has a sectional area equal to when it has a circular sectional shape, and there is a following relation shown by a formula:

$$1.10 \leq (Tr_1 \sim Tr_{10\text{-}30})/Tc \leq 3.00$$

between the basic cell wall thickness (Tc) and each cell wall thickness ($Tr_1 \sim Tr_{10\text{-}30}$) of cells within a first starting end cell from a tenth cell to a thirtieth cells extending inwardly, taking the outermost peripheral cell as a first starting cell.

[13] A ceramic honeycomb structure according to any of the above [1] to [12], wherein the cell walls and the honeycomb outer wall are made of at least one kind of materials selected from the group consisting of cordierite, alumina, mullite, silicon nitride, aluminum titanate (AT), zirconia and silicon carbide.

[14] A ceramic honeycomb structure according to any of the above [1] to [13], which is used as a carrier for catalyst for automobile exhaust gas purification.

[15] A ceramic honeycomb structure according to any of the above [1] to [14], which is assembled into a catalytic converter by loading a catalyst component on the cell walls and holding the honeycomb outer wall at the outer surface.

[16] A ceramic honeycomb structure according to any of the above [1] to [15], wherein the corners of each cell are formed so as to have a radius of curvature of 1.2 mm or less.

[17] A ceramic honeycomb structure according to any of the above [1] to [16], wherein each intersection between each outermost peripheral cell wall and the honeycomb outer wall is formed so as to have a radius of curvature of 1.2 mm or less.

[18] A ceramic honeycomb structure according to any of the above [1] to [17], wherein there is cell deformation and, when a diameter of the honeycomb structure is 120 mm or less, a first or third end cell is any of a third cell to a fifth cell and, when a diameter is more than 120 mm, a first or a third end cell is any of a sixth cell to a twentieth cell.

[19] A ceramic honeycomb structure according to any of the above [1] to [18], wherein there is provided with a corrugated cell wall having a corrugation in the direction of the cells (passages) between at least one pair of cells adjacent to each other, of the cells from the first starting cell to the first end cell or from the second starting cell to the second end cell or from the third starting cell to the third end cell.

As described above, the present invention can provide a ceramic honeycomb structure wherein the disadvantages incurred by the increased pressure loss and the decreased thermal shock resistance and the advantages brought about by the increased isostatic strength and the cell wall shape and honeycomb external shape of higher accuracy are balanced appropriately and which is suitably used, for example, as a carrier for catalyst for automobile exhaust gas purification.

BEST MODE FOR CARRYING OUT THE INVENTION

Figure 1A:
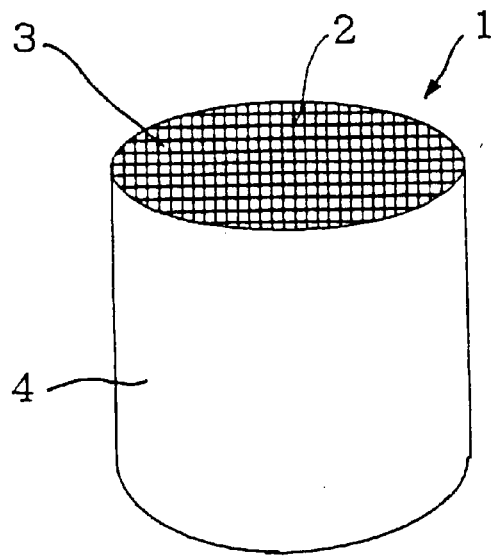
FIG. 1(a) is a perspective view schematically showing an example of the ceramic honeycomb structure of the present invention.

Specific description is made below on the best mode for carrying out the present invention.

As described previously, the ceramic honeycomb structure of the present invention is constituted by cell walls (ribs) forming a composite structure from a plurality of cells being adjacent each other and a honeycomb outer wall surrounding and holding the outermost peripheral cells located at the circumference of the composite structure;

characterized in that a basic thickness of cell walls (the basic cell wall thickness) (Tc) is $Tc \leq 0.12$ mm, an outer wall thickness (Ts) of the honeycomb structure is $Ts \geq 0.05$ mm, and an open frontal area (P) is $P \geq 80\%$, and there is a relation shown by a formula:

$$1.10 \leq (Tr_1 \sim Tr_{3-20})/Tc \leq 3.00$$

between the basic cell wall thickness (Tc) and each cell wall thickness ($Tr_1 \sim Tr_{3-20}$) of cells existing between an outermost peripheral cell and any cell within a first end cell from a third cell to a twentieth cell extending inwardly, taking the outermost peripheral cell as a first starting cell.

As described above, in the ceramic honeycomb structure of the present invention, the basic cell wall thickness (Tc) of the cell walls constituting the honeycomb structure is 0.12 mm or less, preferably 0.07 mm or less; the honeycomb outer wall thickness (Ts) is 0.05 mm or more, preferably 0.1 mm or more; the open frontal area (P) of the basic cell portion is 80% or more; and a relation of $1.10 \leq (Tr_1 \sim Tr_{3-15})/Tc \leq 3.00$, preferably $1.10 \leq (Tr_1 \sim Tr_{3-15})/Tc \leq 2.50$, more preferably $1.20 \leq (Tr_1 \sim Tr_{3-15})/Tc \leq 1.60$ is allowed to hold between the basic cell wall thickness (Tc) and each cell wall thickness ($Tr_1 \sim Tr_{3-15}$) of the cells existing between each outermost peripheral cell (first starting cell) and any cell (first end cell) of the 3rd to 15th cells extending inwardly from the first starting cell. Thereby, a thin wall honeycomb structure can be obtained wherein the disadvantage incurred by the increased pressure loss is balanced against the advantage brought about by the increased isostatic strength are appropriately balanced, and which has an increased isostatic strength and a cell wall shape and honeycomb external shape of higher accuracy.

The embodiment of the ceramic honeycomb structure of the present invention is described below more specifically with referring to the accompanying drawings.

Figure 1B:
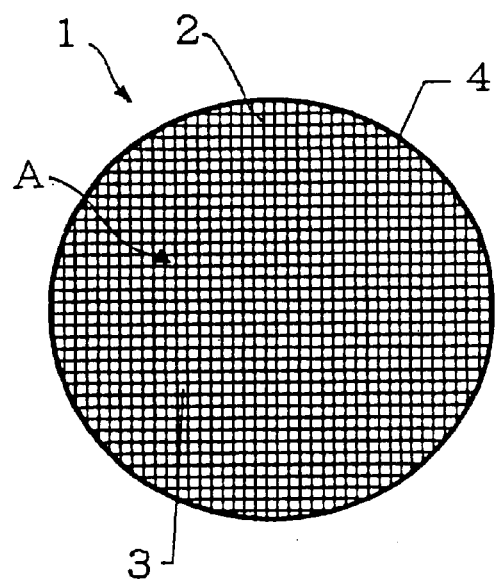
FIG. 1(b) is a plan view schematically showing an example of the ceramic honeycomb structure of the present invention.

FIG. 1(a) is a perspective view schematically showing an example of the ceramic honeycomb structure of the present invention, and FIG. 1(b) is a plan view thereof. A ceramic honeycomb structure 1 comprises a plurality of parallel passages (cells) 3 separated by cell walls 2. Each outermost peripheral cell of the plurality of cells 3 is surrounded and held by a honeycomb outer wall 4.

Figure 2A:
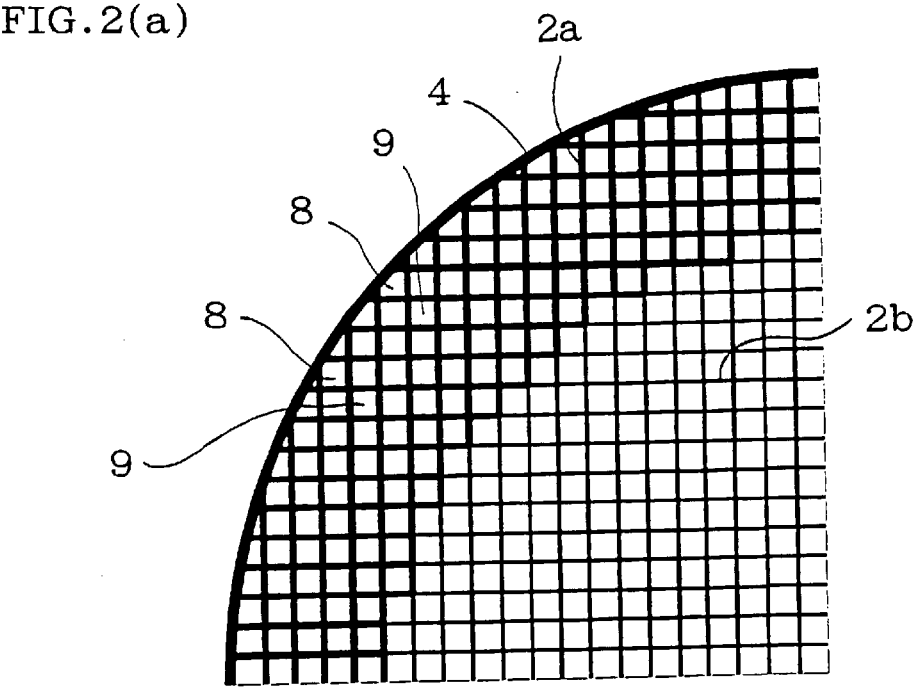
FIG. 2(a) is a partly enlarged view of the portion A of FIG. 1(b).
Figure 2B:
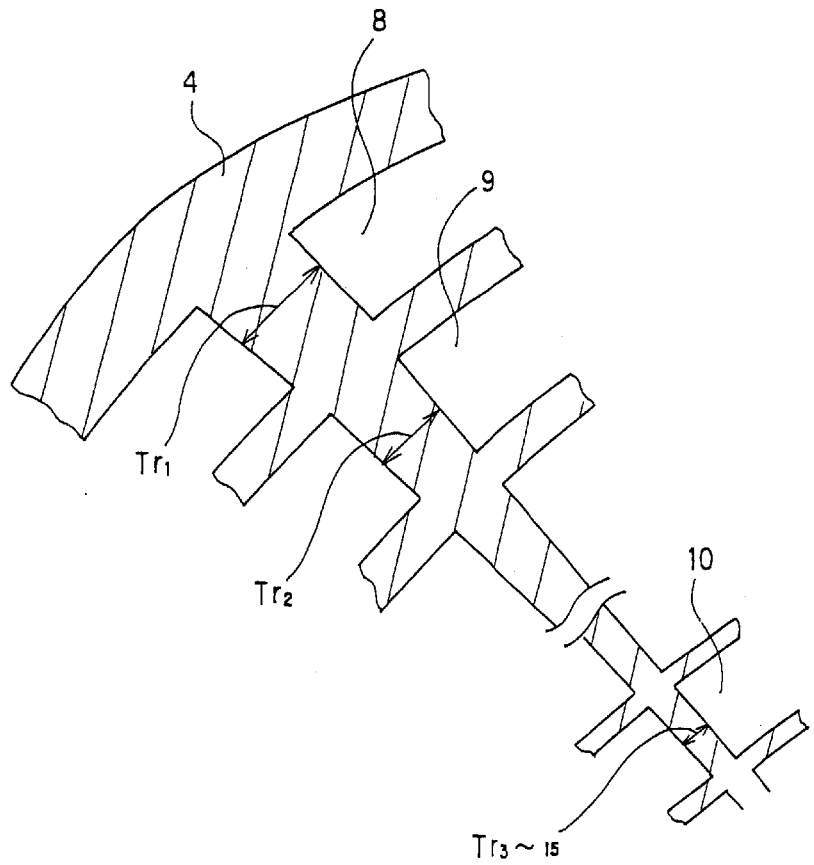
FIG. 2(b) is a further enlarged view of FIG. 2(a).

FIG. 2(a) is a partly enlarged view of the portion A of FIG. 1(b), and FIG. 2(b) is a further enlarged view of FIG. 2(a). As shown in FIGS. 2(a) and 2(b), there is each outermost peripheral cell (first starting cell) 8 in the nearest vicinity of the outer wall 4; and a second cell 9 extends inwardly from the outermost peripheral cell (first starting cell) 8. The wall thickness of the outermost peripheral cell (first starting cell) 8 is shown by $Tr_1$, and the wall thickness of the second cell 9 is shown by $Tr_2$. Similarly, the wall thickness of any cell of the cells existing between 3rd to 15th cells is shown by $Tr_{3-15}$. Incidentally, the cell walls 2 are largely divided into walls 2a of cells near the circumference of honeycomb and walls 2b of basic cells.

In the ceramic honeycomb structure of the present invention, the following relation is specified $$1.10 \leq (Tr_1 \sim Tr_{3\text{-}15})/Tc \leq 3.00$$

between the basic cell wall thickness (Tc) and each cell wall thickness ($Tr_1 \sim Tr_{3\text{-}15}$) of the cells existing between each outermost peripheral cell taken as starting cell and any cell taken as end cell of the 3rd to 15th cells extending inwardly from the starting cell.

When the value [($Tr_1 \sim Tr_{3\text{-}15}$)/Tc] is less than 1.10, no improvement in isostatic strength is seen. When the value is more than 3.00, pressure loss increases.

Thus, in the honeycomb structure 1 of the present invention, each cell wall thickness ($Tr_1 \sim Tr_{3\text{-}15}$) of the cells existing between each outermost peripheral cell (1st cell) and any cell of the 3rd to 15th cells extending inwardly from the 1st cell is made larger than the basic cell wall thickness (Tc) by a given proportion. However, when only the wall thickness ($Tr_1 \sim Tr_2$) of the 1st to 2nd cells is made larger by a given proportion, there is no improvement in isostatic strength or external form accuracy (cell wall shape accuracy); and when the wall thickness of the cells existing between the 1st cell and any cell located inward from the 15th cell is made larger by a given proportion, pressure loss increases; moreover, carrier mass increases to a level higher than specified, resulting in increased heat capacity, which may adversely affect the warm-up property of catalyst during cold start.

Figure 3A:
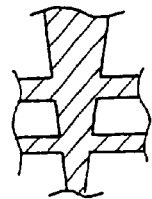
FIG. 3(a) is a sectional view schematically showing an example according to the ceramic honeycomb structure of the present invention, wherein any cell within a second end cell from a third cell to a fifth cell extending inwardly, taking a cell adjacent to the first end cell but located inward therefrom as a second starting cell, has such a cell wall thickness that a section of said each cell wall has such an inverse trapezoidal shape as a minor base of inverse trapezoid is a thickness of said each cell wall when the honeycomb structure is cut by a plane perpendicular to the direction of the cells (passages), and a thickness of a cell wall having a shortest minor base is identical to the basic cell wall thickness (Tc), by shortening a minor base of inverse trapezoid thereof one by one as said each cell wall is located more inwardly.
Figure 3B:
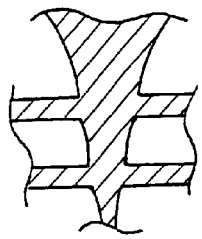
FIG. 3(b) is a sectional view schematically showing an example according to the ceramic honeycomb structure of the present invention, wherein any cell within a second end cell from a third cell to a fifth cell extending inwardly, taking a cell adjacent to the first end cell but located inward therefrom as a second starting cell, has such a cell wall thickness that a section of said each cell wall has such a spool shape as an inner side of spool is shorter than an outer side when the honeycomb structure is cut by a plane perpendicular to the direction of the cells (passages), and a thickness of a cell wall having an shortest inner side is identical to the basic cell wall thickness (Tc), by shortening inner side of spool thereof one by one as said each cell wall is located more inwardly.
Figure 3C:
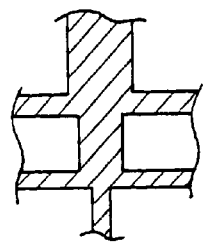
FIG. 3(c) is a sectional view schematically showing an example according to the ceramic honeycomb structure of the present invention, wherein any cell within a second end cell from a third cell to a fifth cell extending inwardly, taking a cell adjacent to the first end cell but located inward therefrom as a second starting cell, has such a cell wall thickness that a section of said each cell wall has a rectangular shape whose minor side of rectangle is a cell wall thickness thereof when the honeycomb structure is cut by a plane perpendicular to the direction of the cells (passages), and a cell wall thickness having a shortest minor side is identical to the basic cell wall thickness (Tc), by shortening a minor side thereof one by one as a cell is located more inwardly.

In the ceramic honeycomb structure of the present invention, it is preferred that, as shown in FIG. 3(a) to FIG. 3(c), the section of each cell wall, within the 2nd end cell of from the 3rd to 5th cells extending inwardly, taking the cell adjacent to the 1st end cell but located inward therefrom as the 2nd starting cell is cut by a plane perpendicular to the cell (passage) direction, is such a rectangular shape as the minor side is the thickness of said each cell wall [FIG. 3(c)], or such an inverse trapezoidal shape as the minor base of inverse trapezoid is present inwardly and is the thickness of said each cell wall [FIG. 3(a)], or such a spool shape as the inner side of spool is shorter than the outer side and is the thickness of said each cell wall [FIG. 3(b)]; the minor side of rectangle, or the inward minor base of inverse trapezoid or the inner side of spool is made shorter as said each cell wall is more inward (the degree of shortening may be 1.10 to 3.00); and the thickness of the cell wall having the shortest minor side, or the shortest minor base or the shortest inner side is made identical to the basic cell wall thickness (Tc). By constituting the present honeycomb structure as above, improvements in pressure loss and thermal shock resistance may be obtained.

In order to prevent the increase in the weight of honeycomb carrier, caused by the thickening of the cell walls near the circumference of honeycomb structure, it is possible to apply padding to the internal portion of the outer wall on at least the areas where outermost peripheral cell walls located adjacent each other come into contact with the outer wall of honeycomb structure, with making the space therebetween narrower (this padding is contact padding) or to the V-shaped areas formed by contact between each intersection of two cell walls and the outer wall (this padding is V-shaped padding) and thereby achieve a rib shape of higher accuracy, an improved isostatic strength, etc. and make the cell wall thickness relatively thin.

Specifically, the corners of each cell are formed so as to have a radius of curvature of preferably 1.2 mm or less and the intersection between cell wall and honeycomb outer wall is formed so as to have a radius of curvature of preferably 1.2 mm or less.

In the present invention, it is also preferred that the following relation is allowed to hold $$1.10 \leq Tr_1/Tc \leq 3.00$$

between the cell wall thickness ($Tr_1$) of each outermost peripheral cell and the basic cell wall thickness (Tc),
when the outermost peripheral cell is referred to as third starting cell and any of the 3rd to 20th cells extending inwardly from the third starting cell is referred to as third end cell, the following relation is allowed to hold $$1.10 \leq (Tr_1 \sim Tr_{3\text{-}20})/Tc \leq 3.00$$

between the basic cell wall thickness (Tc) and each cell wall thickness ($Tr_1 \sim Tr_{3\text{-}20}$) of the cells existing between the third starting cell and the third end cell, and
when the honeycomb structure is cut by a plane perpendicular to the direction of the cells (passages) and the resulting section of each cell wall of the cells existing from the third starting cell to the third end cell is seen, the section of said each cell wall is allowed to have such a rectangular shape as the minor side is the thickness of said each cell wall, or such an inverse trapezoidal shape as the minor base of inverse trapezoid is present inwardly and is the thickness of said each cell wall, or such a spool shape as the inner side of spool is shorter than the outer side and is the thickness of said each cell wall; the minor side of rectangle, or the inward minor base of inverse trapezoid or the inner side of spool is made shorter as said each cell wall is more inward; and the thickness of the cell wall having the shortest minor side, or the shortest minor base or the shortest inner side is made identical to the basic cell wall thickness (Tc). By constituting the present honeycomb structure as above, improvements in pressure loss and thermal shock resistance can be obtained.

In the present invention, it is also preferred in view of the pressure loss in practical application that the basic cell wall thickness and each cell wall thickness ($Tr_1 \sim Tr_{3\text{-}20}$) have, as mentioned previously, a more restricted relation of $1.10 \leq (Tr_1 \sim Tr_{3\text{-}20})/Tc \leq 2.50$, or an even more restricted relation of $1.20 \leq (Tr_1 \sim Tr_{3\text{-}20})/Tc \leq 1.60$.

As to the sectional shape of cell, used in the present invention, there is no particular restriction. However, a sectional shape of, for example, a triangle or a higher polygon can be mentioned. In particular, any of a square, rectangle and a hexagon is preferred.

As the sectional shape of honeycomb outer wall, used in the present invention, there can be mentioned, for example, a circle, an ellipse, a trapezoid, a triangle, a square, a hexagon or a special shape whose left and right are asymmetrical to each other. Of these, a circle or an ellipse is preferred.

In recent years, honeycomb carriers have come to be mounted in large vehicles (e.g. trucks) as well and large-sized honeycomb carriers have become necessary. In the case of such a large-sized honeycomb carrier as having a diameter of 144 mm or more when the sectional shape of honeycomb outer wall is a circle, or, when the sectional shape is other shape, having a sectional area equal to when the sectional shape is a circle, it is preferred that the first end cell counted from the outermost peripheral cell (1st starting cell) is stretched to any of the 10th to 40th cells, preferably the 10th to 30th cells, all extending inwardly from the outermost peripheral cell, that is, the cells of thickened wall are increased and that the ratio of the cell wall thickness ($Tr_1 \sim Tr_{10-40}$), preferably ($Tr_1 \sim Tr_{10-30}$) to the basic cell wall thickness (Tc), i.e. ($Tr_1 \sim Tr_{10-40}$)/Tc, preferably ($Tr_1 \sim Tr_{10-30}$)/Tc is set ordinarily at 1.10 to 3.00 and, in practical application, at 1.10 to 2.50, preferably 1.20 to 1.60.

As the material for cell wall and honeycomb outer wall, used in the present invention, there can be mentioned, for example, at least one kind of material selected from the group consisting of cordierite, alumina, mullite, silicon nitride, aluminum titanate (AT), zirconia and silicon carbide.

Figure 4:
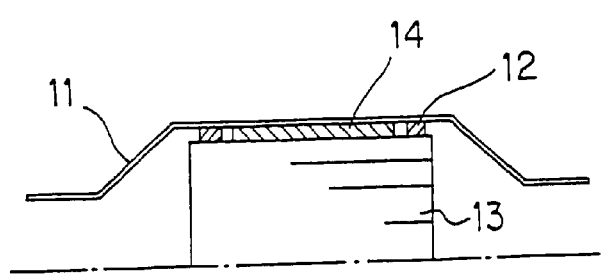
FIG. 4 is a drawing schematically showing a case where the ceramic honeycomb structure (honeycomb carrier) of the present invention has been accommodated in a catalytic converter container.
Figure 5:
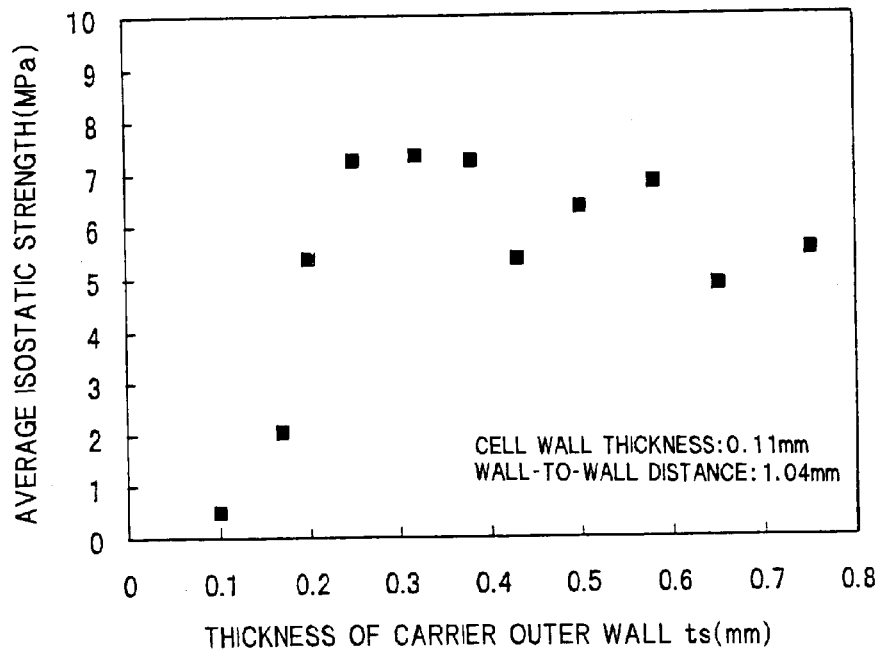
FIG. 5 is a graph showing the results obtained when there were produced cordierite-made thin wall honeycomb structure samples having an outer diameter of 90 mm, a length of 110 mm, a square cell shape, a cell wall thickness of 0.11 mm and a cell density of 600 cpsi (wall-to-wall distance: 1.04 mm) wherein the outer wall thickness was varied between 0.1 and 0.9 mm to measure isostatic strength thereof.
Figure 6:
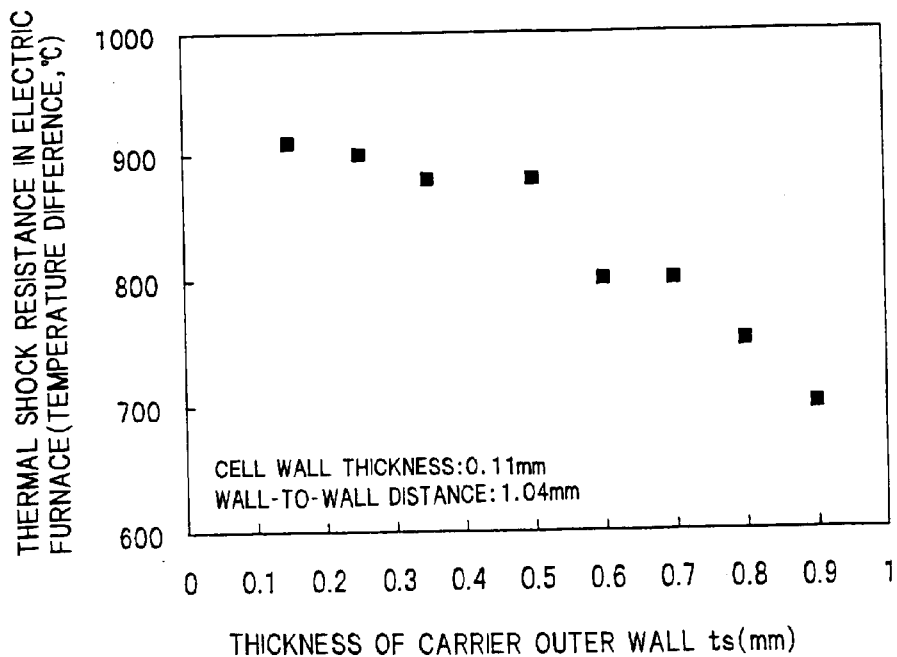
FIG. 6 is a graph showing the results obtained when there was conducted a test for thermal shock resistance in supercooling, wherein a honeycomb carrier having a cell wall thickness of 0.11 mm was heated in an electric furnace for a given length of time to make the temperature uniform and then taken out from the furnace.
Figure 7:
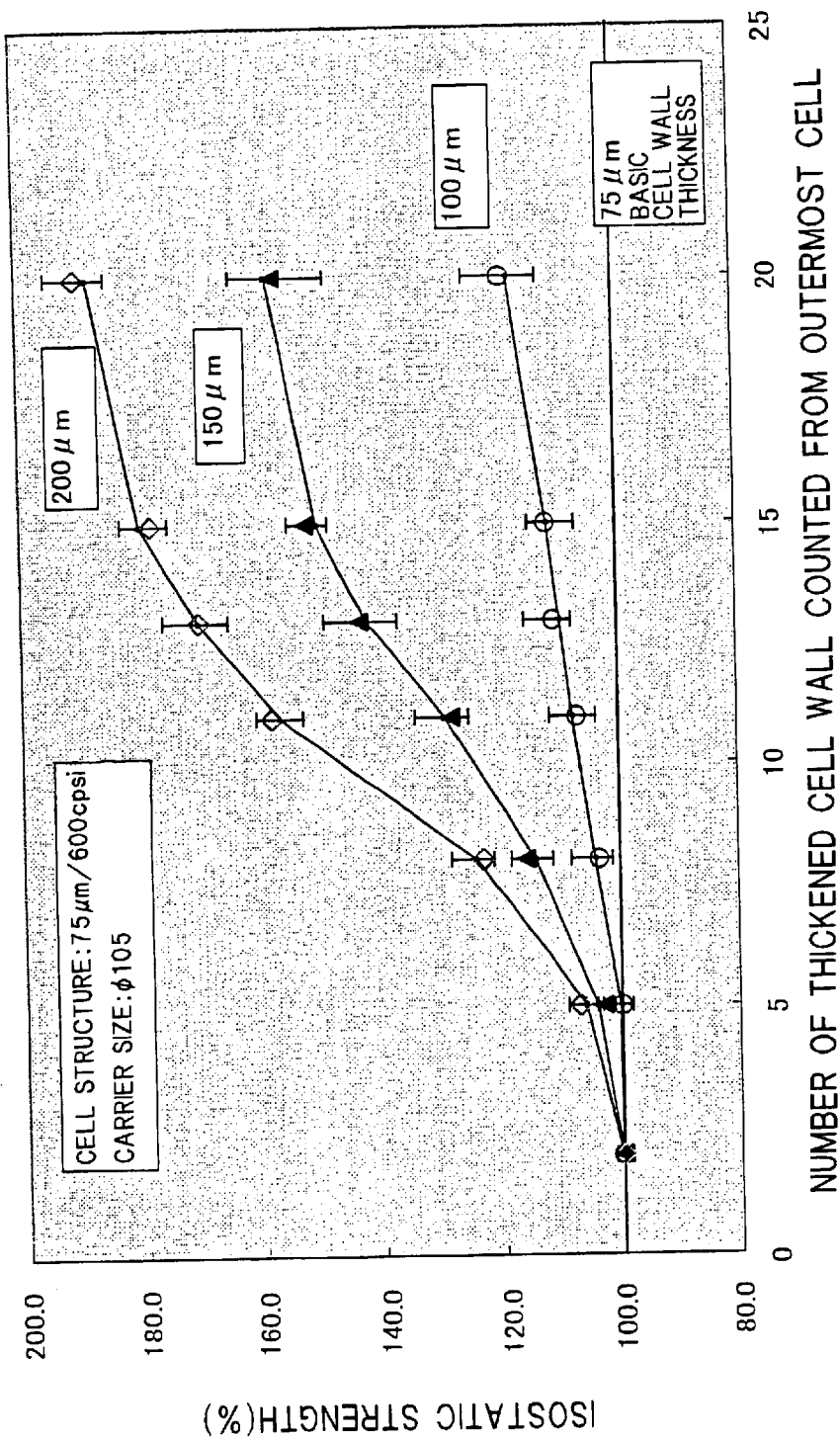
FIG. 7 is a graph showing the results obtained when each cell wall thickness of the cells existing between each outermost peripheral cell taken as a starting cell and any cell of the 2nd to 20th cells extending inwardly from the starting cell was increased from the basic cell wall thickness (75 $\mu$m) to 100 $\mu$m, 150 $\mu$m or 200 $\mu$m and each of the resulting honeycomb structures was measured for isostatic strength (%).
Figure 8:
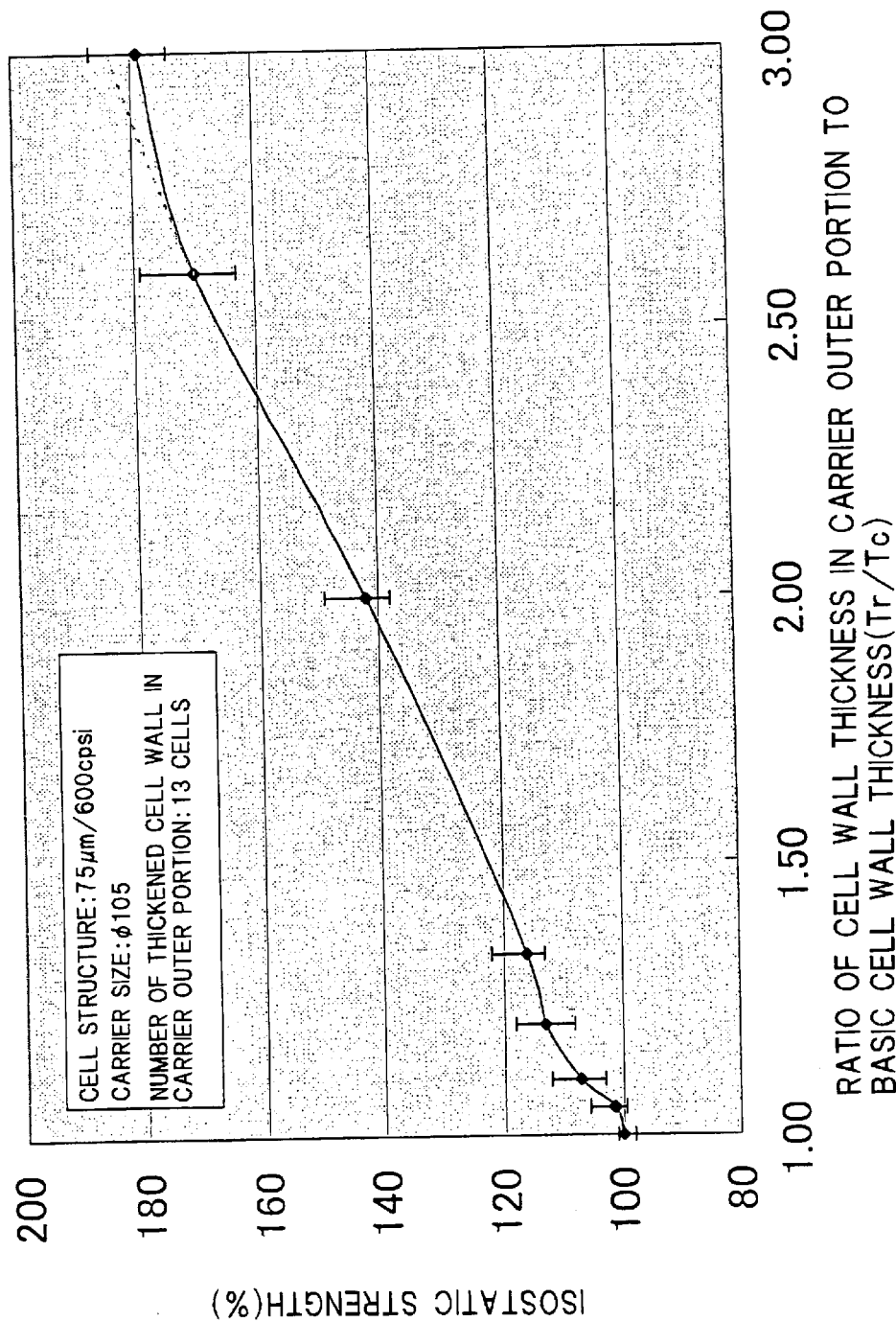
FIG. 8 is a graph showing the results obtained when each cell wall thickness ($Tr_1 \sim Tr_{13}$) of the 1st cell (taken as starting cell) to the 13th cell was made thicker one by one than the basic cell wall thickness (Tc) so as to give a ratio of 1.00 to 3.00 in terms of $[(Tr_1 \sim Tr_{13})/(Tc)]$ and measurement of isostatic strength (%) was made.
Figure 9:
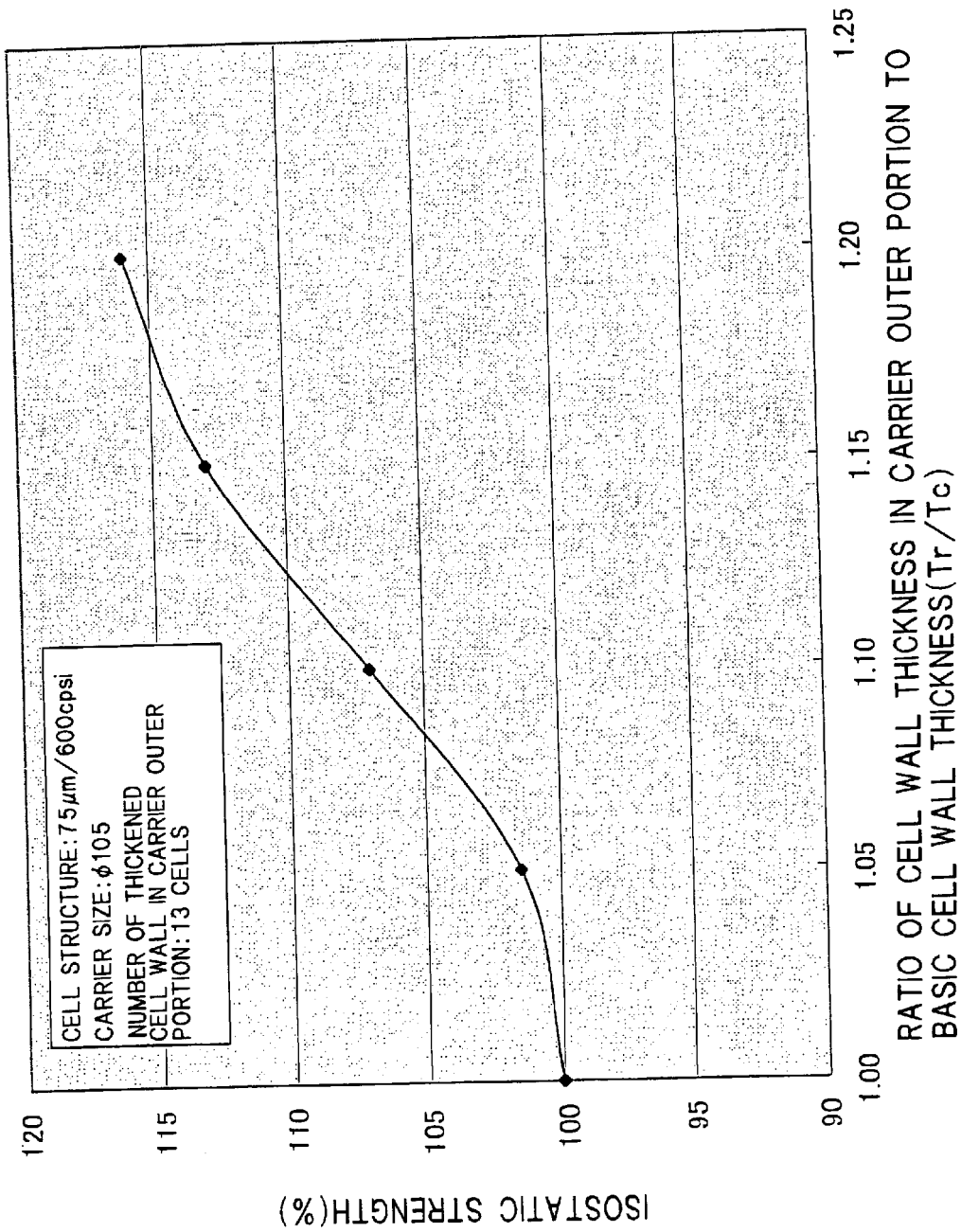
FIG. 9 is a partly enlarged view of FIG. 8.
Figure 10:
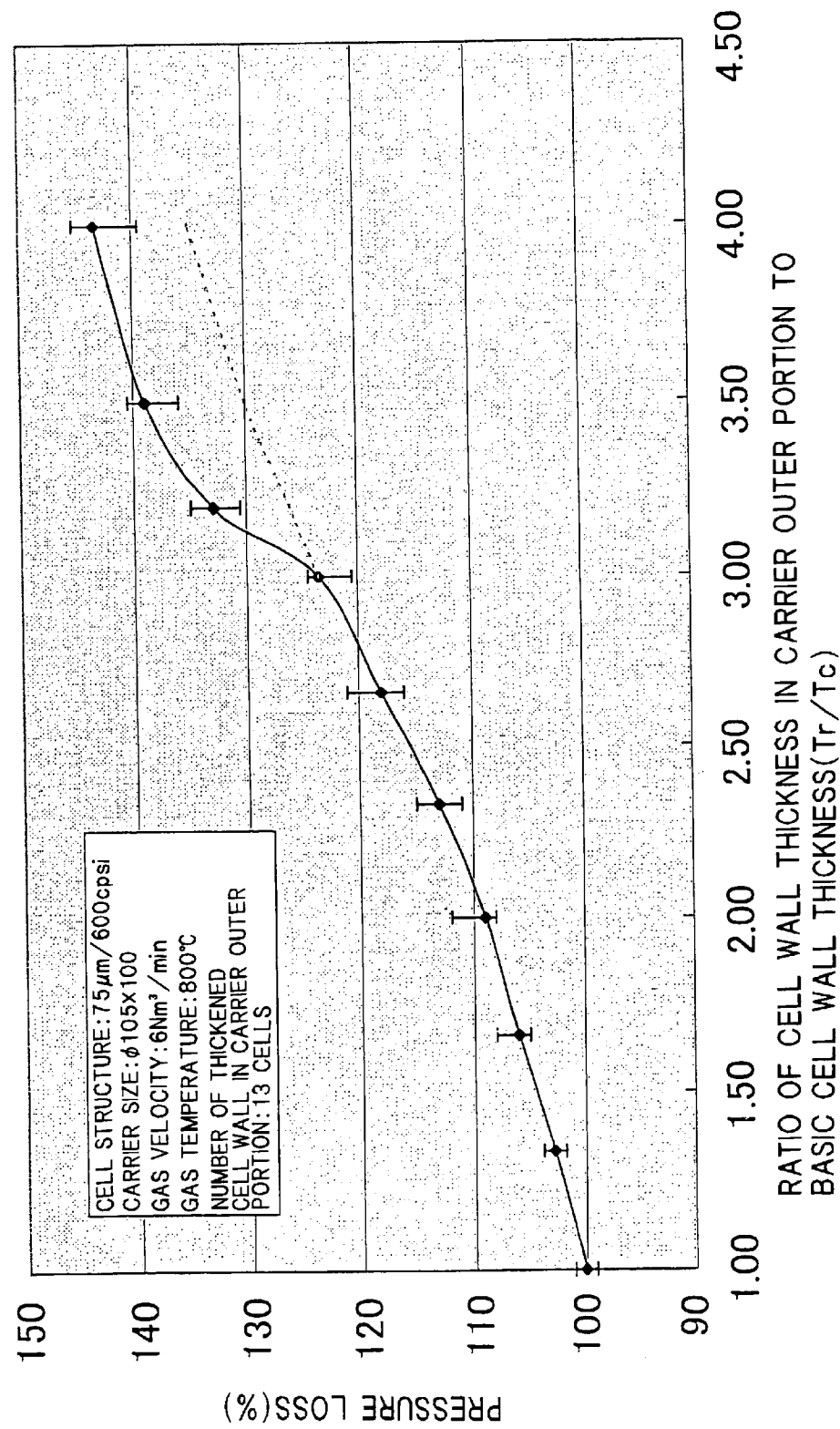
FIG. 10 is a graph showing the results obtained when each cell wall thickness ($Tr_1 \sim Tr_{13}$) of the 1st cell (taken as starting cell) to the 13th cell was made thicker one by one than the basic cell wall thickness (Tc) so as to give a ratio of 1.00 to 3.00 in terms of $[(Tr_1 \sim Tr_{13})/(Tc)]$ and measurement of pressure loss (%) was made.
Figure 11:
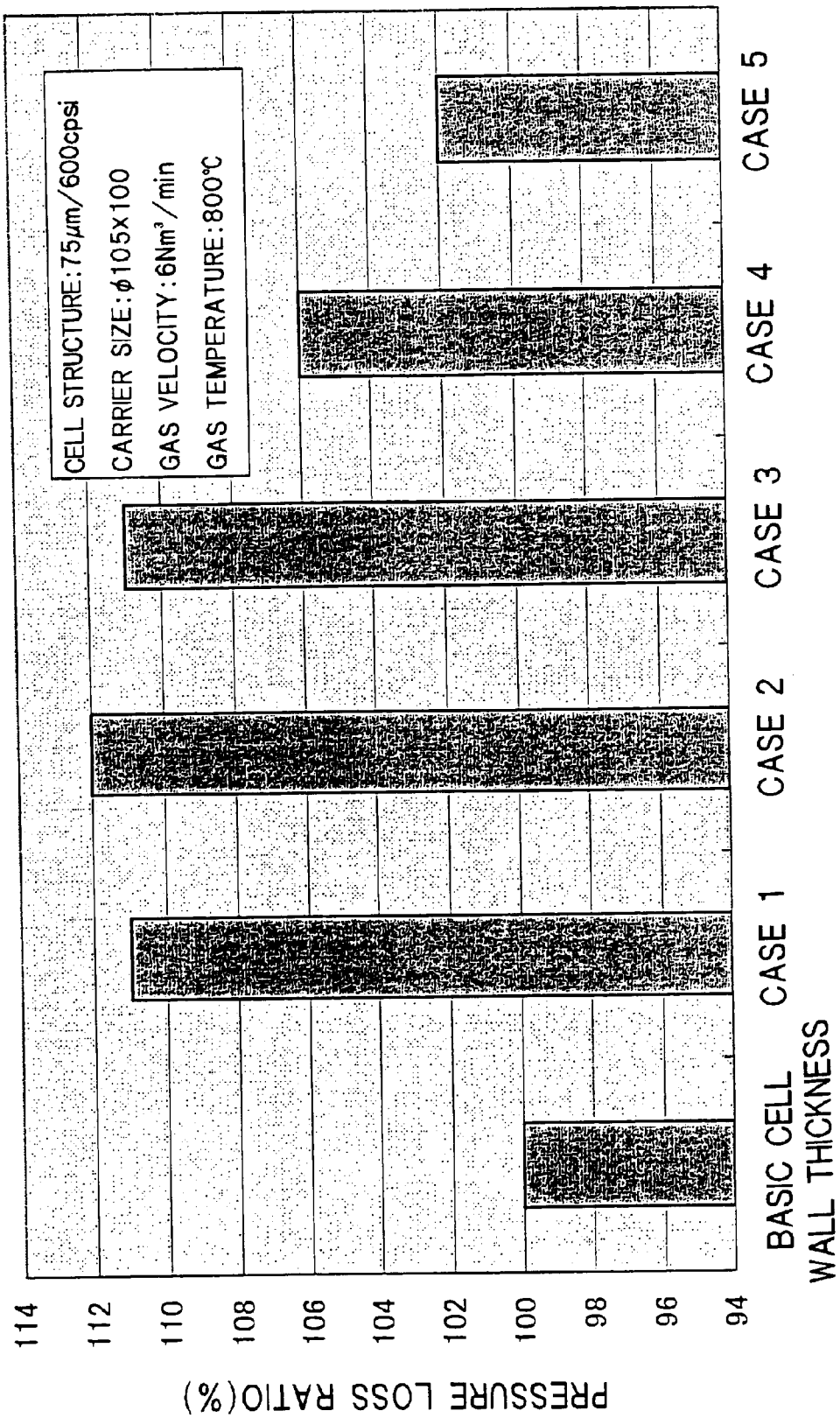
FIG. 11 is a graph showing the results obtained when each cell wall thickness ($Tr_1 \sim Tr_{15}$) of the 1st cell (taken as starting cell) to the 15th cell was made larger than the basic cell wall thickness (Tc) so as to give a ratio of 2.0 in terms of $[(Tr_1 \sim Tr_{15})/(Tc)]$ and measurement of pressure loss (%) was made (case 1); when, in addition to the conditions of the case 1, the section of each cell wall of the 16th to 20th cells when cut by a plane perpendicular to the cell (passage) direction was allowed to have such an inverse trapezoidal shape as the minor base of inverse trapezoid was present inwardly and was the thickness of said each cell wall, the minor base of inverse trapezoid was made shorter as said each cell wall was more inward, and the thickness of the cell wall having the shortest minor base was made identical to the basic cell wall thickness (Tc) (case 2); when, in addition to the case 1, the section of each cell wall of the 16th to 20th cells when cut by a plane perpendicular to the direction of the cell (passage) direction was allowed to have such a spool shape as the inner side of spool was shorter than the outer side and was the thickness of said each cell wall, the inner side of spool was made shorter as said each cell wall was more inward, and the thickness of the cell wall having the shortest inner side was made identical to the basic cell wall thickness (Tc) (case 3); when the ratio [$Tr_1/(Tc)$] of the outermost peripheral cell wall thickness ($Tr_1$) to the basic cell wall thickness (Tc) was set at 2.0, the section of each cell wall of 2nd and later cells when cut by a plane perpendicular to the cell (passage) direction was allowed to have such an inverse trapezoidal shape as the minor base of inverse trapezoid was present inwardly and was the thickness of said each cell wall, the minor base of inverse trapezoid was made shorter as said each cell wall was more inward, the thickness of the cell wall having the shortest minor base was made identical to the basic cell wall thickness (Tc), and pressure loss (%) was measured (case 4); and when the ratio [$Tr_1/(Tc)$] of the outermost peripheral cell wall thickness ($Tr_1$) to the basic cell wall thickness (Tc) was set at 2.0, the section of each cell wall of 2nd and later cells when cut by a plane perpendicular to the cell (passage) direction was allowed to have such a spool shape as the inner side of spool was shorter than the outer side and was the thickness of said each cell wall, the inner side of spool was made shorter as said each cell wall was more inward, the thickness of the cell wall having the shortest inner side was made identical to the basic cell wall thickness (Tc), and pressure loss (%) was measured.
Figure 12:
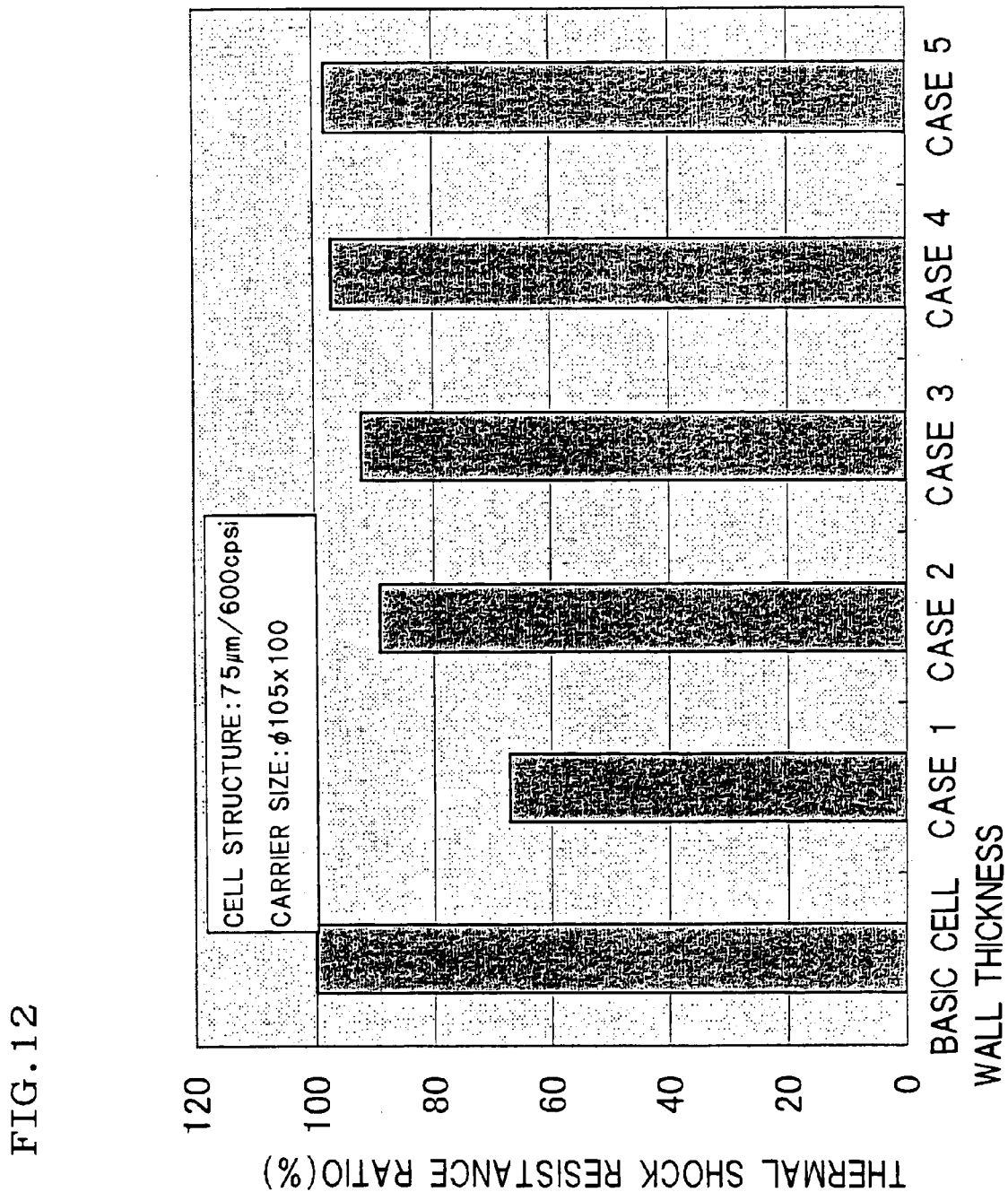
FIG. 12 is a graph showing the results obtained when, in the cases of FIG. 11, thermal shock resistance (%) was measured in place of pressure loss.
Figure 13:
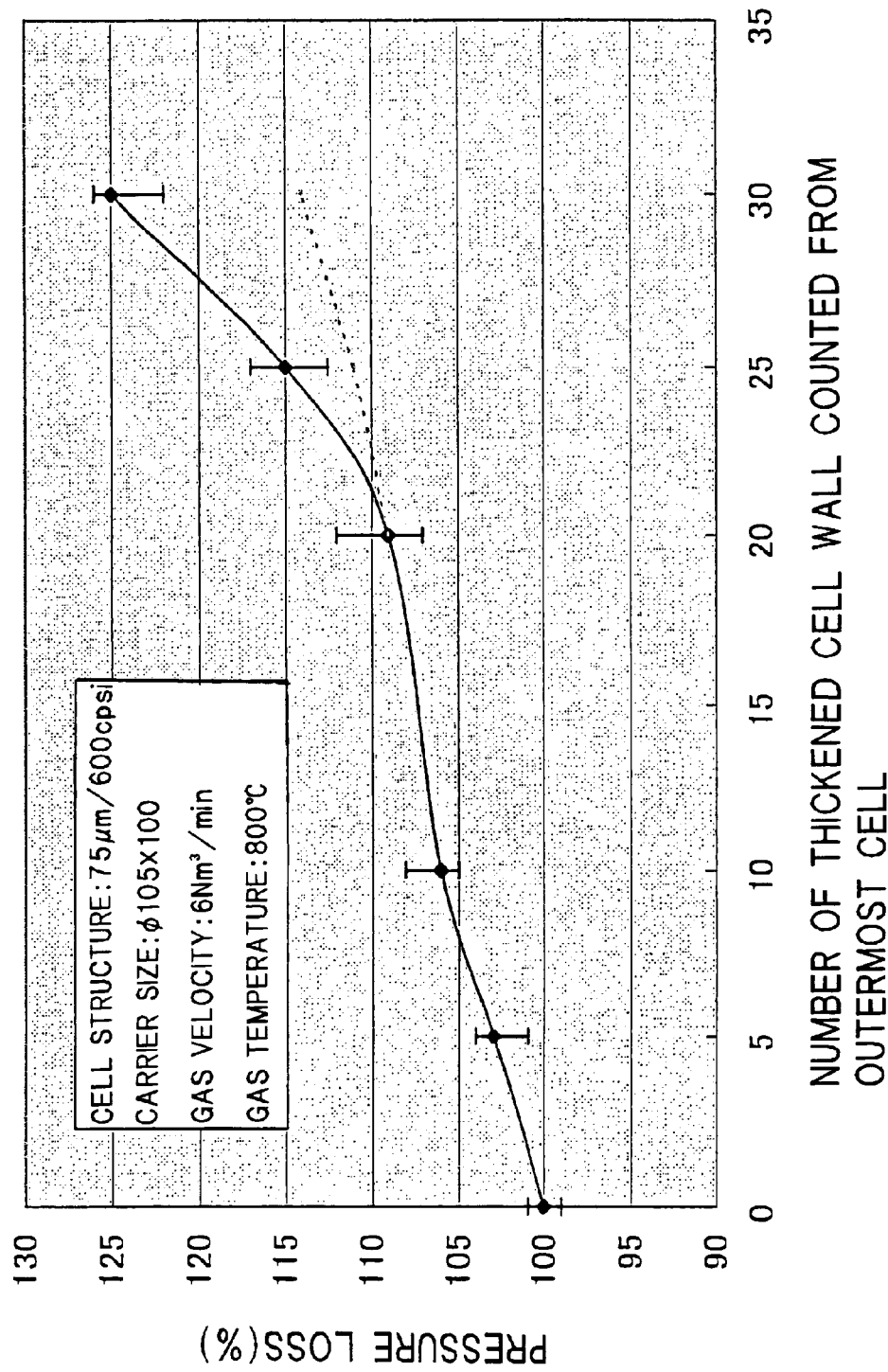
FIG. 13 is a graph showing the results obtained when pressure loss (%) was measured by setting, at 2.0, the ratio of each cell wall thickness ($Tr_1 \sim Tr_{30}$) of the cells existing between the outermost peripheral cell taken as a starting cell and any cell extending therefrom to the 30th cell, to the basic cell wall thickness, i.e. [$(Tr_1 \sim Tr_{30})/(Tc)$].
Figure 14:
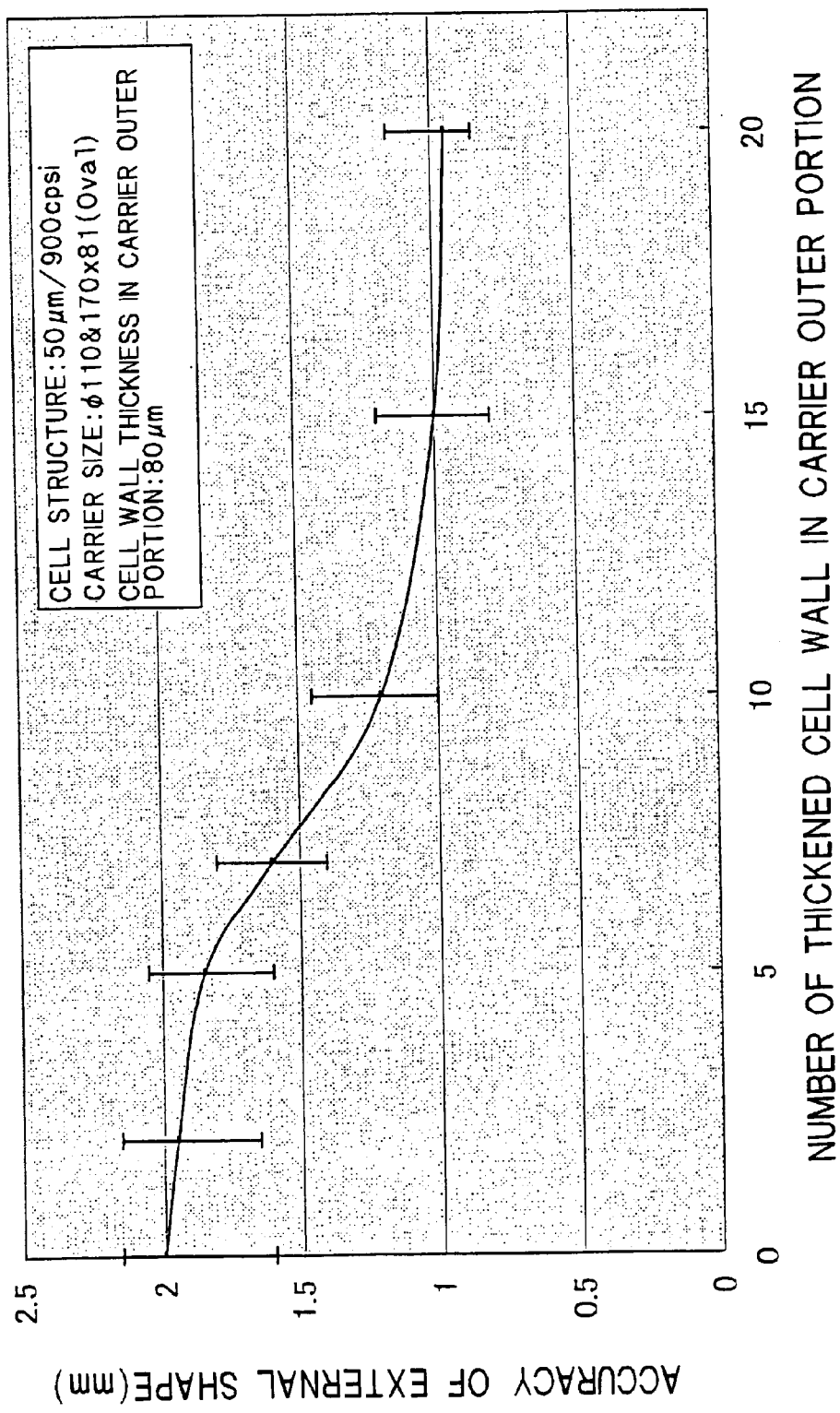
FIG. 14 is a graph showing the results obtained when external shape accuracy (mm) was measured by setting, at 1.6, the ratio of each cell wall thickness ($Tr_1 \sim Tr_{20}$) of the cells existing between the outermost peripheral cell taken as a starting cell and any cell extending therefrom to the 20th cell, to the basic cell wall thickness, i.e. [$(Tr_1 \sim Tr_{20})/(Tc)$].
Figure 15:
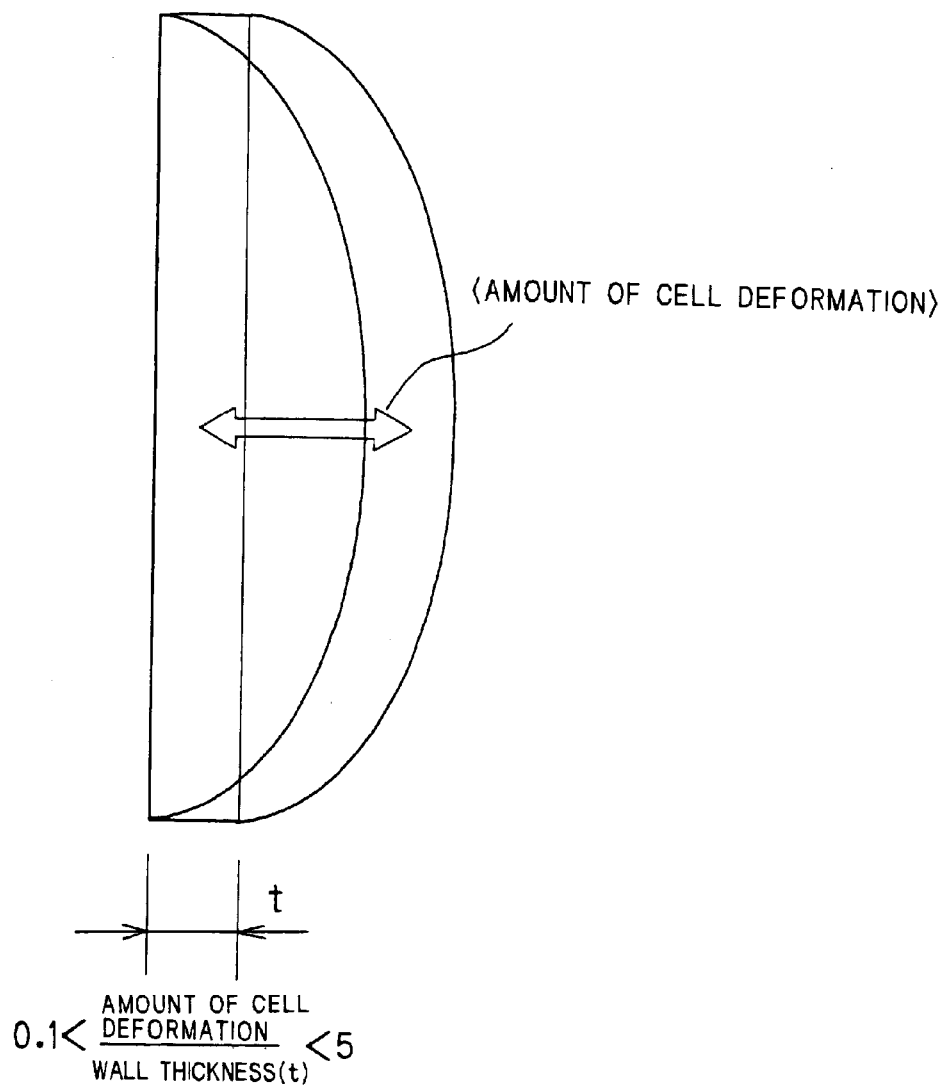
FIG. 15 is a drawing schematically showing an idea of cell deformation.

FIG. 4 is a drawing schematically showing a case in which the honeycomb carrier of the present invention has been accommodated in a catalytic converter container. A honeycomb carrier 13 is held by a ring 12 at the outer surface and accommodated in a converter container 11. There is no particular restriction as to the ring 12, but a metal mesh-made ring is ordinarily used. Between the converter container 11 and the outer surface of the honeycomb carrier 13, a buffer member 14 (e.g. a mat or a cloth) is preferably interposed.

Next, the present invention is more specifically described by way of Examples. However, the present invention is in no way restricted by these Examples.

Incidentally, the honeycomb structures obtained in the Examples were evaluated for performance by the following methods.

Isostatic Strength Test

The test and evaluation were made according to the JASO standard M 505-87 issued by Society of Automotive Engineer of Japan, Inc. In Table 1, evaluation was made by three grades of no increase (increase was not seen as a significance difference as compared with standard), small increase, and increase.

Thermal Shock Resistance Test

This is a test in which a honeycomb carrier of room temperature is placed in an electric furnace kept at a temperature higher than room temperature by a given temperature, is kept for 20 minutes, is taken out onto a refractory brick, is observed for appearance, and is lightly tapped by a metal bar at the outer surface. An evaluation of "pass" is given when the carrier appearance shows no crack and a metallic sound (not a thick sound) is heard when tapped. The test is repeated until a "fail" evaluation is reached when the temperature inside the electric furnace is gradually increased by each 50° C. When "fail" is reached at a temperature of 950° C. higher than room temperature, the thermal shock resistance of the honeycomb carrier is taken as 900° C. difference.

External Shape Accuracy Test

Accuracy of honeycomb structure circumference was measured using a three-dimension tester.

Pressure Loss Test

A converter accommodating a catalyst-loaded honeycomb structure was fitted to a 2-liter 4-cylinder engine. A difference between the pressure at the converter inlet and the pressure at the converter outlet was measured and taken as the pressure difference of the honeycomb structure.

EXAMPLES 1 TO 53 AND COMPARATIVE EXAMPLES 1 TO 25

A kneaded raw material consisting of talc, kaolin, alumina, water and a binder was subjected to extrusion molding and then fired to produce various cordierite-based honeycomb structure samples each having a square cell shape, a diameter of 106 mm, a length of 155 mm, an outer wall thickness of 0.2 mm and an open frontal area (P) of 80% or more. In these samples, the cell structure, basic cell wall thickness, No. of cells of thickened wall near the circumference of honeycomb structure, thickness of thickened cell walls near the circumference of honeycomb structure, and ratio of thickness of thickened cell walls to basic cell wall thickness were varied as shown in Table 1. Each honeycomb structure (carrier) produced was subjected to isostatic strength test, thermal shock resistance test, pressure loss test and external shape accuracy test. The results are shown in Tables 1 to 4.

Incidentally, Example 18 is a case where the wall thickness of the outermost peripheral cell (starting cell) to the 15th cell was set at 0.150 mm and each wall of the 16th to 20th cells was formed as follows:

the section of said each wall had such an inverse trapezoidal shape as the minor base of inverse trapezoid was present inwardly, the minor base of inverse trapezoid was shorter as said each wall was more inward, and the thickness of the cell wall having the shortest minor base was identical to the basic cell wall thickness (Tc) (0.075 mm). Example 19 is a case where the wall thickness of the outermost peripheral cell (starting cell) to the 15th cell was set at 0.150 mm and each wall of the 16th to 20th cells was formed as follows:

the section of said each wall had such a spool shape as the inner side of spool was shorter than the outer side, the inner side of spool was shorter as said each wall was more inward, and the thickness of the cell wall having the shortest inner side was identical to the basic cell wall thickness (Tc) (0.075 mm). Examples 20 and 21 are cases where each wall of the outermost peripheral cell (staring cell) to the 20th cell was formed as follows:

the section of said each wall had an inverse trapezoidal or spool shape, the thickness of said each wall was shorter as said each wall was more inward, and the thickness of the cell wall having the smallest thickness was identical to the basic cell wall thickness (Tc) (0.075 mm). The same thing is also applicable to Examples 50, 51, 52 and 53.

TABLE 1

| Example or Comparative Example | Cell Structure (mil/cpsi) | Basic cell wall thickness (A) | Thickness of thickened cell walls (B) | (B) / (A) | No. of cells of thickened wall | Isostatic strength | Shape accuracy | Pressure loss (hp) | Thermal shock resistance |
|---|---|---|---|---|---|---|---|---|---|
| Comparative example 1 | 3.0/600 | 0.075 | 0.075 | 1.0 | 0 | Standard | Standard | Standard | Standard |
| Comparative example 2 | 3.0/600 | 0.075 | 0.100 | 1.33 | 2 | No increase | Not improved | Small increase | Equivalent to standard |

TABLE 1-continued

| Example or Comparative Example | Cell Structure (mil/cpsi) | Basic cell wall thickness (A) | Thickness of thickened cell walls (B) | (B) / (A) | No. of cells of thickened wall | Isostatic strength | Shape accuracy | Pressure loss (hp) | Thermal shock resistance |
|---|---|---|---|---|---|---|---|---|---|
| Example 1 | 3.0/600 | 0.075 | 0.100 | 1.33 | 5 | Small increase | Not improved | Small increase | Equivalent to standard |
| Example 2 | 3.0/600 | 0.075 | 0.100 | 1.33 | 8 | Increase | Slightly improved | Increase | Equivalent to standard |
| Example 3 | 3.0/600 | 0.075 | 0.100 | 1.33 | 11 | Increase | Improved | Increase | Equivalent to standard |
| Comparative example 3 | 3.0/600 | 0.075 | 0.080 | 1.07 | 13 | No increase | Slightly improved | Increase | Equivalent to standard |
| Example 4 | 3.0/600 | 0.075 | 0.085 | 1.13 | 13 | Small increase | Slightly improved | Increase | Equivalent to standard |
| Example 5 | 3.0/600 | 0.075 | 0.090 | 1.20 | 13 | Small increase | Improved | Increase | Equivalent to standard |
| Example 6 | 3.0/600 | 0.075 | 0.100 | 1.33 | 13 | Small increase | Improved | Increase | Equivalent to standard |
| Comparative example 4 | 3.0/600 | 0.075 | 0.150 | 2.00 | 2 | No increase | Not improved | Small increase | — |
| Example 7 | 3.0/600 | 0.075 | 0.150 | 2.00 | 5 | Small increase | Slightly improved | Increase | — |
| Example 8 | 3.0/600 | 0.075 | 0.150 | 2.00 | 8 | Increase | Improved | Increase | — |
| Example 9 | 3.0/600 | 0.075 | 0.150 | 2.00 | 11 | Increase | Improved | Increase | — |
| Example 10 | 3.0/600 | 0.075 | 0.150 | 2.00 | 13 | Increase | Improved | Increase | — |
| Example 11 | 3.0/600 | 0.075 | 0.200 | 2.67 | 2 | No increase | Not improved | — | — |
| Example 12 | 3.0/600 | 0.075 | 0.200 | 2.67 | 5 | Small increase | Slightly improved | — | — |
| Example 13 | 3.0/600 | 0.075 | 0.200 | 2.67 | 8 | Increase | Improved | — | — |
| Example 14 | 3.0/600 | 0.075 | 0.200 | 2.67 | 11 | Increase | Improved | — | — |
| Example 15 | 3.0/600 | 0.075 | 200 | 67 | 13 | Increase | Improved | Increase | — |
| Example 16 | 3.0/600 | 0.075 | 0.225 | 3.00 | 13 | Increase | — | Increase | — |
| Comparative Example 5 | 3.0/600 | 0.075 | 0.240 | 3.20 | 13 | Increase | — | Big increase | — |
| Comparative example 6 | 3.0/600 | 0.075 | 0.260 | 3.50 | 13 | Increase | — | Big increase | — |
| Comparative example 7 | 3.0/600 | 0.075 | 0.300 | 4.00 | 13 | Increase | — | Big increase | — |
| Example 17 | 3.0/600 | 0.075 | 0.150 | 2.00 | 15 | Increase | — | Increase | Decrease |
| Example 18 | 3.0/600 | 0.075 | 0.150 ~ 0.075 | 2.00 Inverse trapezoid-like decrease | 15 16–20 | Increase | — | Increase | Slight decrease |
| Example 19 | 3.0/600 | 0.075 | 0.150 ~ 0.075 | 2.00 Spool-like decrease | 15 16–20 | Increase | — | Increase | Slight decrease |
| Example 20 | 3.0/600 | 0.075 | 0.150 ~ 0.075 | Inverse trapezoid-like decrease | 20 | Increase | Improved | Smaller than in Exams. 17 to 19 | Equivalent to standard |
| Example 21 | 3.0/600 | 0.075 | 0.150 ~ 0.075 | Spool-like decrease | 20 | Increase | Improved | Smaller than in Exams. 17 to 19 | Equivalent to standard |
| Example 22 | 3.0/600 | 0.075 | 0.150 | 2.00 | 10 | Increase | — | Increase | — |
| Example 23 | 3.0/600 | 0.075 | 0.150 | 2.00 | 20 | — | — | Increase | — |
| Example 24 | 3.0/600 | 0.075 | 0.150 | 2.00 | 25 | — | — | Big increase | — |
| Example 25 | 3.0/600 | 0.075 | 0.150 | 2.00 | 30 | — | — | Big increase | — |

TABLE 2

| Example or Comparative Example | Cell Structure (mil/cpsi) | Basic cell wall thickness (A) | Thickness of thickened cell walls (B) | (B) / (A) | No. of cells of thickened wall | Isostatic strength | Shape accuracy | Pressure loss (hp) | Thermal shock resistance |
|---|---|---|---|---|---|---|---|---|---|
| Comparative Example 8 | 2.0/900 | 0.050 | 0.050 | 1.0 | 0 | Standard | Standard | Standard | Standard |
| Example 26 | 2.0/900 | 0.050 | 0.055 | 1.1 | 10 | Small increase | Slightly improved | Increase | Equivalent to standard |

TABLE 2-continued

| Example or Comparative Example | Cell Structure (mil/cpsi) | Basic cell wall thickness (A) | Thickness of thickened cell walls (B) | (B) / (A) | No. of cells of thickened wall | Isostatic strength | Shape accuracy | Pressure loss (hp) | Thermal shock resistance |
|---|---|---|---|---|---|---|---|---|---|
| Example 27 | 2.0/900 | 0.050 | 0.060 | 1.2 | 10 | Small increase | Improved | Increase | Equivalent to standard |
| Example 28 | 2.0/900 | 0.050 | 0.065 | 1.3 | 10 | Small increase | Improved | Increase | Equivalent to standard |
| Example 29 | 2.0/900 | 0.050 | 0.070 | 1.4 | 10 | Increase | Improved | Increase | Equivalent to standard |
| Example 30 | 2.0/900 | 0.050 | 0.075 | 1.5 | 10 | Increase | Improved | Increase | Equivalent to standard |
| Example 31 | 2.0/900 | 0.050 | 0.080 | 1.6 | 10 | Increase | Improved | Increase | Equivalent to standard |
| Example 32 | 2.0/900 | 0.050 | 0.085 | 1.7 | 10 | Increase | Improved | Increase | Slight decrease |
| Example 33 | 2.0/900 | 0.050 | 0.090 | 1.8 | 10 | Increase | Improved | Increase | Slight decrease |
| Example 34 | 2.0/900 | 0.050 | 0.100 | 2.0 | 10 | Increase | Improved | Increase | Decrease |
| Example 35 | 2.0/900 | 0.050 | 0.125 | 2.5 | 10 | Increase | Improved | Increase | Decrease |
| Example 36 | 2.0/900 | 0.050 | 0.150 | 3.0 | 10 | Increase | Improved | Increase | Slight decrease |
| Comparative Example 9 | 2.0/900 | 0.050 | 0.175 | 3.5 | 10 | Increase | Improved | Big increase | Big decrease |
| Example 37 | 2.0/900 | 0.050 | 0.080 | 1.6 | 2 | No increase | Not improved | Small increase | Equivalent to standard |
| Example 38 | 2.0/900 | 0.050 | 0.080 | 1.6 | 5 | Small increase | Slightly improved | Small increase | Equivalent to standard |
| Example 39 | 2.0/900 | 0.050 | 0.080 | 1.6 | 7 | Small increase | Improved | Increase | Equivalent to standard |
| Example 40 | 2.0/900 | 0.050 | 0.080 | 1.6 | 10 | Increase | Improved | Increase | Equivalent to standard |
| Example 41 | 2.0/900 | 0.050 | 0.080 | 1.6 | 15 | Increase | Improved | Increase | Slight decrease |
| Example 42 | 2.0/900 | 0.050 | 0.080 | 1.6 | 20 | Increase | — | Increase | Slight decrease |
| Comparative Example 10 | 2.0/900 | 0.050 | 0.080 | 1.6 | 25 | Increase | — | Big increase | Slight decrease |

TABLE 3

| Example or Comparative Example | Cell Structure (mil/cpsi) | Basic cell wall thickness (A) | Thickness of thickened cell walls (B) | (B) / (A) | No. of cells of thickened wall | Isostatic strength | Shape accuracy | Pressure loss (hp) | Thermal shock resistance |
|---|---|---|---|---|---|---|---|---|---|
| Comparative Example 11 | 5.0/200 | 0.125 | 0.125 | 1.0 | 0 | Standard | Standard | Standard | Standard |
| Comparative Example 12 | 5.0/200 | 0.125 | 0.200 | 1.6 | 10 | Increase | Improved | Increase | Equivalent to standard |
| Comparative Example 13 | 4.5/300 | 0.115 | 0.115 | 1.0 | 0 | Standard | Standard | Standard | Standard |
| Example 43 | 4.5/400 | 0.115 | 0.175 | 1.52 | 10 | Increase | Improved | Increase | Equivalent to standard |
| Comparative Example 14 | 4.0/400 | 0.100 | 0.100 | 1.0 | 0 | Standard | Standard | Standard | Standard |
| Example 44 | 4.0/400 | 0.100 | 0.150 | 1.5 | 10 | Increase | Improved | Increase | Equivalent to standard |
| Comparative Example 15 | 3.5/400 | 0.090 | 0.090 | 1.0 | 0 | Standard | Standard | Standard | Standard |
| Comparative Example 16 | 3.5/400 | 0.090 | 0.135 | 1.50 | 2 | No increase | Not improved | Small increase | Equivalent to standard |
| Example 45 | 3.5/400 | 0.090 | 0.135 | 1.50 | 10 | Increase | Improved | Increase | Equivalent to standard |
| Example 46 | 3.5/400 | 0.090 | 0.135 | 1.50 | 15 | Increase | Improved | Increase | Equivalent to standard |
| Comparative Example 17 | 3.5/400 | 0.090 | 0.135 | 1.50 | 25 | Increase | Improved | Big increase | Slight decrease |
| Comparative Example 18 | 3.5/600 | 0.090 | 0.090 | 1.0 | 0 | Standard | Standard | Standard | Standard |
| Example 47 | 3.5/600 | 0.090 | 0.125 | 1.39 | 10 | Increase | Improved | Increase | Equivalent to standard |

TABLE 4

| Example or Comparative Example | Cell Structure (mil/cpsi) | Basic cell wall thickness (A) | Thickness of thickened cell walls (B) | (B) / (A) | No. of cells of thickened wall | Isostatic strength | Shape accuracy | Pressure loss (hp) | Thermal shock resistance |
|---|---|---|---|---|---|---|---|---|---|
| Comparative Example 19 | 1.5/900 | 0.035 | 0.035 | 1.0 | 0 | Standard | Standard | Standard | Standard |
| Example 48 | 1.5/900 | 0.035 | 0.065 | 1.86 | 15 | Increase | Improved | Increase | Equivalent to standard |

TABLE 4-continued

| Example or Comparative Example | Cell Structure (mil/cpsi) | Basic cell wall thickness (A) | Thickness of thickened cell walls (B) | (B) / (A) | No. of cells of thickened wall | Isostatic strength | Shape accuracy | Pressure loss (hp) | Thermal shock resistance |
|---|---|---|---|---|---|---|---|---|---|
| Comparative Example 20 | 2.0/1200 | 0.050 | 0.050 | 1.0 | 0 | Standard | Standard | Standard | Standard |
| Example 49 | 2.0/1200 | 0.050 | 0.080 | 1.60 | 10 | Increase | Improved | Increase | Equivalent to standard |
| Comparative Example 21 | 1.5/1200 | 0.035 | 0.035 | 1.0 | 0 | Standard | Standard | Standard | Standard |
| Comparative Example 22 | 1.5/1200 | 0.035 | 0.065 | 1.86 | 2 | No increase | Not improved | Small increase | Equivalent to standard |
| Comparative Example 23 | 1.5/1200 | 0.035 | 0.065 | 1.86 | 10 | Increase | Improved | Increase | Equivalent to standard |
| Example 50 | 1.5/1200 | 0.035 | 0.065~0.035 Inverse trapezoid-like decrease | 1.86 | 15 16–20 | Increase | Improved | Increase | Equivalent to standard |
| Example 51 | 1.5/1200 | 0.035 | 0.065~0.035 Inverse trapezoid-like decrease | 1.86 | 30 | Increase | Improved | Big increase | Slight decrease |
| Comparative Example 24 | 1.0/1200 | 0.025 | 0.035 | 1.0 | 0 | Standard | Standard | Standard | Standard |
| Example 52 | 1.0/1200 | 0.025 | 0.065~0.025 Inverse trapezoid-like decrease | 2.6 | 10 11–20 | Increase | Improved | Increase | Equivalent to standard |
| Comparative Example 25 | 1.0/1800 | 0.025 | 0.035 | 1.0 | 0 | Standard | Standard | Standard | Standard |
| Example 53 | 1.0/1800 | 0.025 | 0.065~0.025 Inverse trapezoid-like decrease | 2.6 | 10 11–20 | Increase | Improved | Increase | Equivalent to standard |

As appreciated from Tables 1 to 4, good results are obtained when the requirements for the present invention are satisfied. Similar results were obtained also with other cell structures of triangle, hexagon, etc.

The above performance evaluation of honeycomb structures was made on a case of no cell deformation in honeycomb structure. It was confirmed that similar performances are obtained also on a case of cell deformation in honeycomb structure, as long as there is a relation of $1.10 \leq (Tr_1 \sim Tr_{3-20})/Tc \leq 3.00$ between the basic cell wall thickness (Tc) and each cell wall thickness ($Tr_1 \sim Tr_{3-20}$).

Herein, "cell deformation" refers to a state in which cell wall (rib) is deformed relative to the central axis of honeycomb carrier. The amount of deformation indicates a case in which deformation is 1.1 to 5.0 times the thickness of cell wall (rib).

Figure 16:
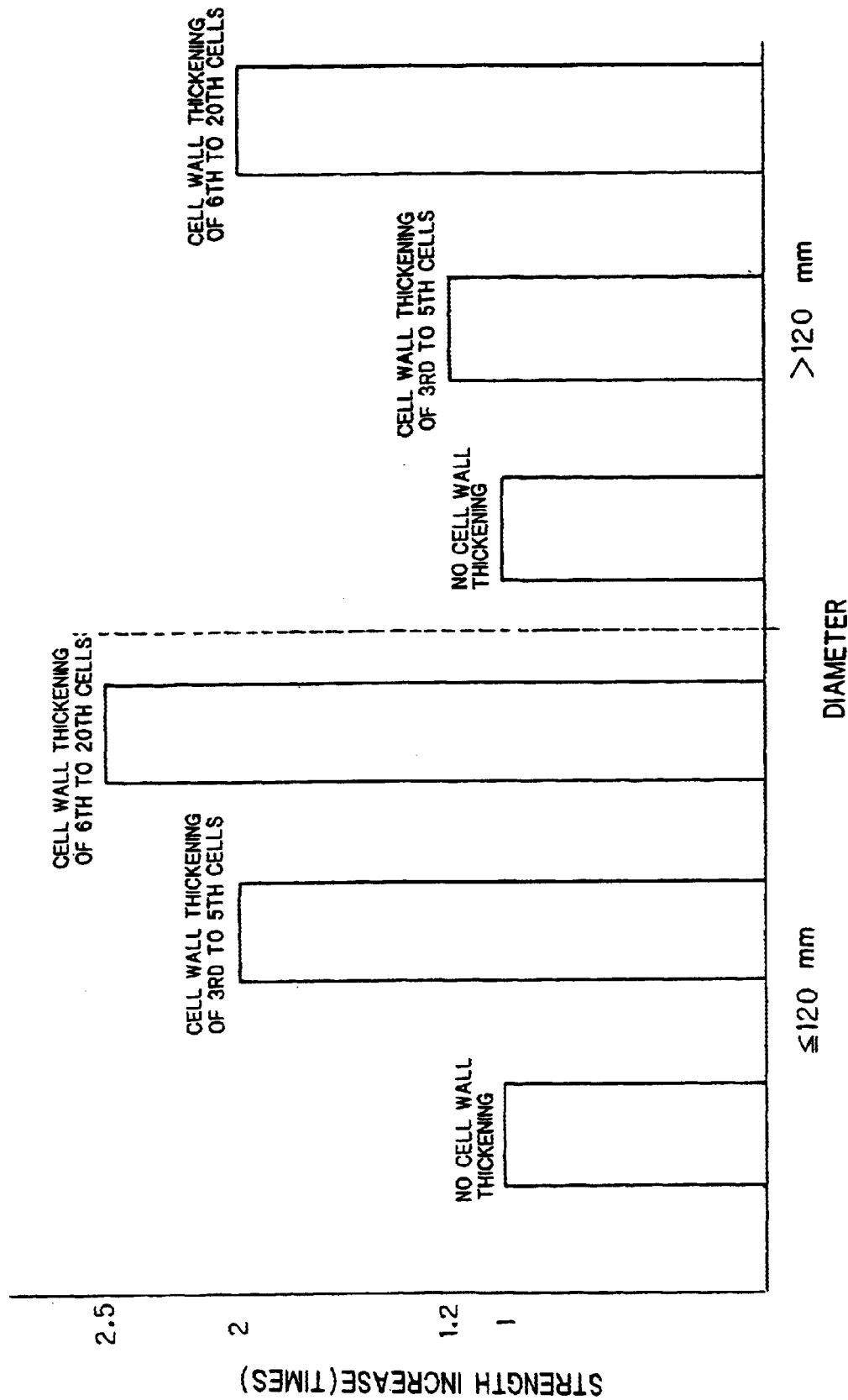
FIG. 16 is a drawing showing a relation between the diameter of ceramic honeycomb structure and strength increase.

It was confirmed that in a ceramic honeycomb structure having "cell deformation", a sufficient strength can be obtained when the 1st or 3rd end cell is any of the 3rd to 5th cells (when the honeycomb structure has a diameter of 120 mm or less) or the 1st or 3rd end cell is any of the 6th to 20th cells (when the honeycomb structure has a diameter of more than 120 mm). That is, as shown in FIG. 16, when the honeycomb structure had a diameter of 120 mm or less and the 1st or 3rd end cell was any of the 3rd to 5th cells, there was obtained a sufficient strength which was 2 times as compared with a honeycomb structure using no reinforced cell and having an ordinary cell wall thickness; when the honeycomb structure had a diameter of more than 120 mm and the 1st or 3rd end cell was any of the 6th to 20th cells, there was obtained a sufficient strength which was 2 times as compared with a honeycomb structure using no reinforced cell and having an ordinary cell wall thickness. Even when the honeycomb structure had a diameter of more than 120 mm and the 1st or 3rd end cell was any of the 3rd to 5th cells, there was obtained a sufficient strength which was 1.2 times as compared with a honeycomb structure using no reinforced cell and having an ordinary cell wall thickness.

Figure 17:
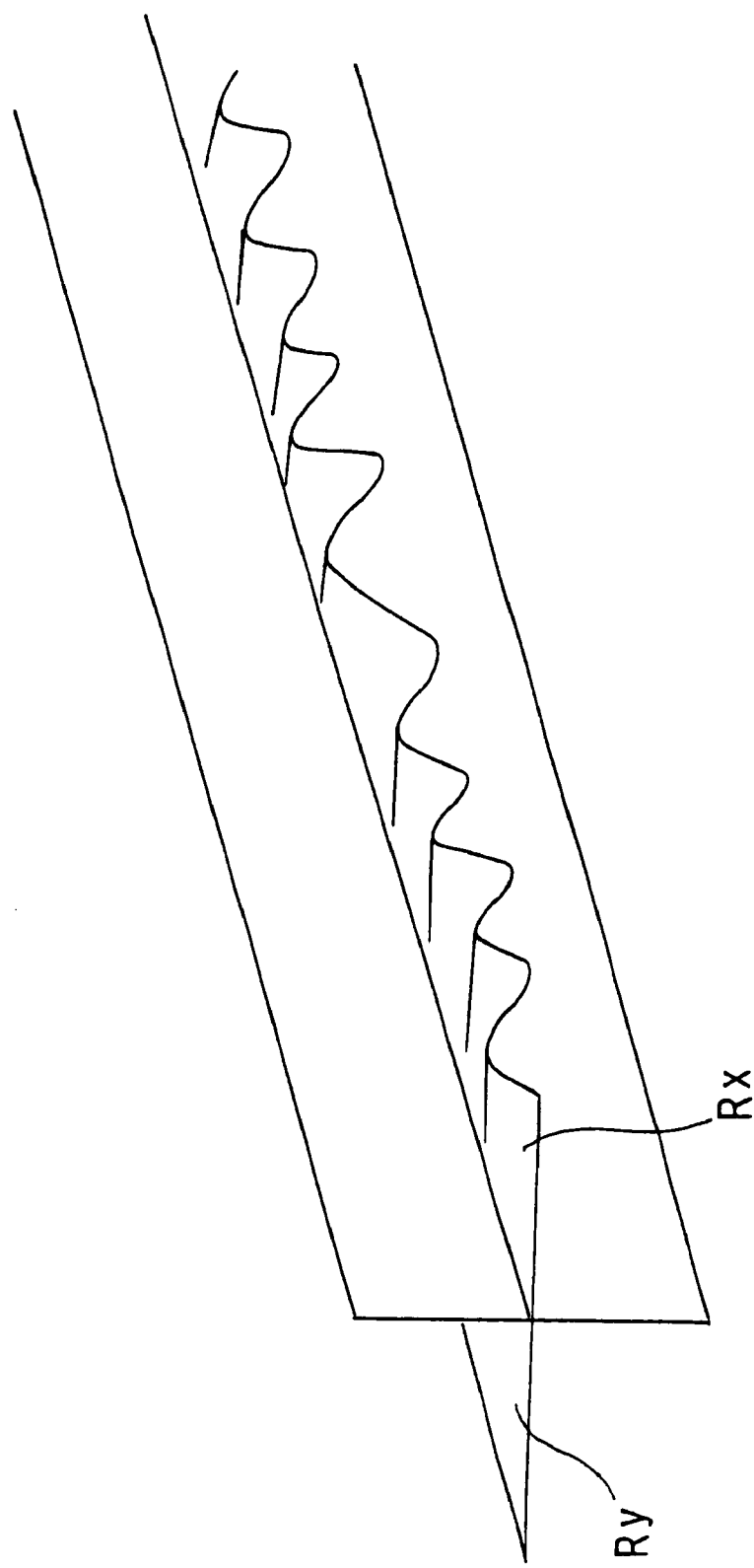
FIG. 17 is a perspective view schematically showing a corrugated cell wall having a corrugation in the cell (passage) direction.

It was also confirmed that a honeycomb structure having, in the cells from the starting cell to the end cell, a corrugated cell wall (such as shown in FIG. 17) having a corrugation at the intersection of at least one pair of two adjacent walls (for example, a pair of Rx and Ry in FIG. 17) was superior, in thermal shock resistance, to a honeycomb structure having an ordinary cell wall having no corrugation, in addition to the above-mentioned evaluated performance. That is, it is confirmed that a honeycomb structure having a corrugated cell wall showed a superior thermal shock resistance (a higher resistance to cracking) than a honeycomb structure having an ordinary cell wall having no corrugation by subjecting the place including the boundary portion possessing at least corrugated shape to a cycle of heating at 1,200° C. for 5 minutes and then cooling for 5 minutes was conducted 10 times (10 cycles) according to a burner test (a test for examining the tendency of crack formation) described later. The honeycomb structures used in this test had the same material and shape as in Example 1.

Burner Test

Figure 18:
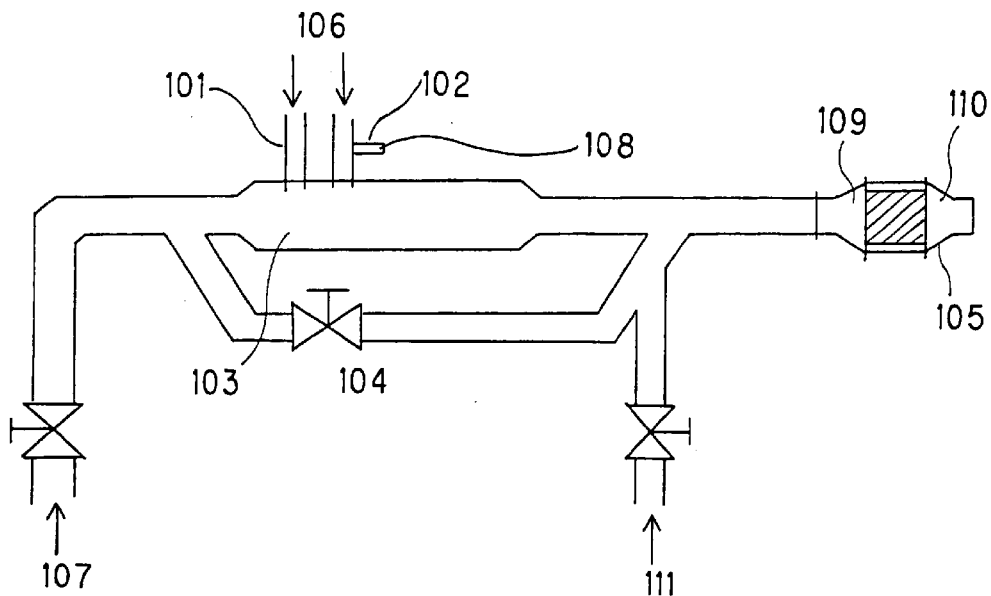
FIG. 18 is a drawing schematically showing the tester used in measurement of isostatic strength.

A tester shown in FIG. 18 was used. This tester is Maremont Exhaust Gas Simulator Model No. 3 or an equivalent thereto, or a hydraulic isostatic tester (a product of NGK INSULATORS, LTD.) or an equivalent thereto. As shown in FIG. 18, this tester has a main burner 101, a pilot burner 102, a combustion chamber 103, a bypass 104 and a holder 105. Into the combustion chamber 103 are fed an LPG 106 and heating air 107, and ignition is made using a spark plug 108 to give rise to combustion. In the holder 105 are set a sample 110 and, in the vicinity thereof, a thermocouple 109. The bypass 104 switches the heating air 107 and cooling air 111 to each other, whereby a cold-hot cycle is applied to the sample 110.

Figure 19:
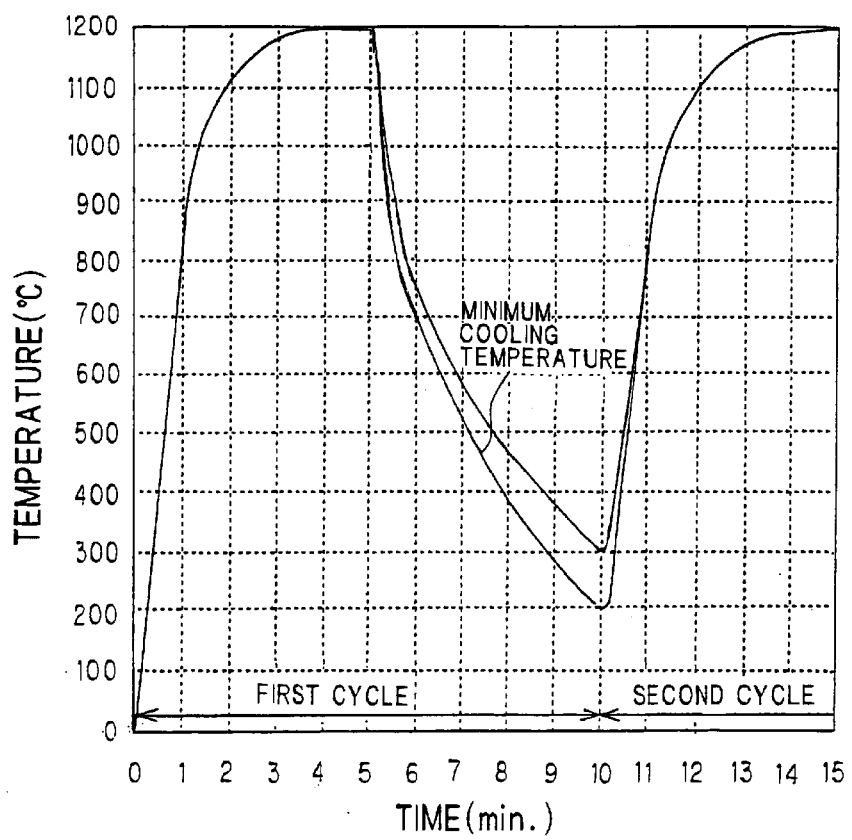
FIG. 19 is a graph showing the cold-hot cycle of 1,200° C.×cycles used in the test method for measurement of isostatic strength.

The test method was as follows. First, a holding material (not shown in FIG. 18) was wound round the sample 110, and the sample was set in the holder 105 so that no gas passed outside the sample 110. Then, the thermocouple 109 was set 5 mm upstream of the gas inlet end of the sample 110. Then, a cold-hot cycle of 1,200° C.×10 cycles, shown in FIG. 19 was applied to the sample 110. Lastly, formation of cracks in the sample 110 was examined by observation. Incidentally, the gas flow rate during heating was 1.0 Nm³/min.

Industrial Applicability

The honeycomb structure of the present invention can be suitably used as a carrier for catalyst, etc., particularly as a carrier for catalyst for automobile exhaust gas purification, etc. The honeycomb structure of the present invention is also used suitably as a filter for diesel particulate or the like, as a chemical reactor (e.g. a catalyst carrier for fuel cell reformer), or as a heat exchanger.

What is claimed is:

1. A ceramic honeycomb structure (1) constituted by cell walls (ribs) (2) forming a composite structure from a plurality of cells (3) being adjacent each other and a honeycomb outer wall (4) forming a circumference of the composite structure surrounding and holding the outermost peripheral cells located at the circumference of the composite structure the contact the outer wall;

characterized in that a basic thickness of cell walls (2) (the basic cell wall thickness) (Tc) is Tc≦0.12 mm, an outer wall thickness (Ts) of the honeycomb structure is Ts≧0.05 mm, and an open frontal area (P) is P≧80%, and there is a relation shown by a formula:

$$1.10 \leq (Tr_1 \sim Tr_{3\text{-}20})/Tc \leq 3.00$$

between the basic cell wall thickness (Tc) and each cell wall thickness ($Tr_1 \sim Tr_{3\text{-}20}$) of cells existing between an outermost peripheral cell and any cell within a first end cell from a third cell to a twentieth cell extending inwardly, taking the outermost peripheral cell as a first starting cell.

2. A ceramic honeycomb structure according to claim 1, wherein there is a relation shown by a formula:

$$1.10 \leq (Tr_1 \sim Tr_{3\text{-}15})/Tc \leq 3.00$$

between the basic cell wall thickness (Tc) and each cell wall thickness ($Tr_1 \sim Tr_{3\text{-}15}$) of cells existing between an outermost peripheral cell and any cell within a first end cell from a third cell to a fifteenth cell extending inwardly, taking the outermost peripheral cell as a first starting cell.

3. A ceramic honeycomb structure according to claim 1, wherein any cell within a second end cell from a third cell to a fifth cell extending inwardly, taking a cell adjacent to the first end cell but located inward therefrom as a second starting cell, has such a cell wall thickness that a section of said each cell wall has a rectangular shape whose minor side of rectangle is a cell wall thickness thereof when the honeycomb structure is cut by a plane perpendicular to the direction of the cells (passages), and a cell wall thickness having a shortest minor side is identical to the basic cell wall thickness (Tc), by shortening a minor side thereof one by one as a cell is located more inwardly.

4. A ceramic honeycomb structure according to claim 1, wherein any cell within a second end cell from a third cell to a fifth cell extending inwardly, taking a cell adjacent to the first end cell but located inward therefrom as a second starting cell, has such a cell wall thickness that a section of said each cell wall has such an inverse trapezoidal shape as a minor base of inverse trapezoid is a thickness of said each cell wall when the honeycomb structure is cut by a plane perpendicular to the direction of the cells (passages), and a thickness of a cell wall having a shortest minor base is identical to the basic cell wall thickness (Tc), by shortening a minor base of inverse trapezoid thereof one by one as said each cell wall is located more inwardly.

5. A ceramic honeycomb structure according to claim 1, wherein any cell within a second end cell from a third cell to a fifth cell extending inwardly, taking a cell adjacent to the first end cell but located inward therefrom as a second starting cell, has such a cell wall thickness that a section of said each cell wall has such a spool shape as an inner side of spool is shorter than an outer side when the honeycomb structure is cut by a plane perpendicular to the direction of the cells (passages), and a thickness of a cell wall having an shortest inner side is identical to the basic cell wall thickness (Tc), by shortening inner side of spool thereof one by one as said each cell wall is located more inwardly.

6. A ceramic honeycomb structure according to claim 1, wherein there is a relation shown by a formula $$1.10 \leq Tr_1/Tc \leq 3.00$$

between the cell wall thickness ($Tr_1$) of each outermost peripheral cell and the basic cell wall thickness (Tc), there is a relation shown by a formula $$1.10 \leq (Tr_1 \sim Tr_{3\text{-}20})/Tc \leq 3.00$$

between the basic cell wall thickness (Tc) and each cell wall thickness ($Tr_1 \sim Tr_{3\text{-}20}$) within a third end cell from a third cell to a twentieth cell extending inwardly, taking the outermost peripheral cell as a first starting cell, a section of said each cell wall has such a rectangular shape as a minor side thereof is thickness of said each cell wall, or such an inverse trapezoidal shape as a minor base of inverse trapezoid is present inwardly and is thickness of said each cell wall, or such a spool shape as inner side of spool is shorter than outer side when the honeycomb structure is cut by a plane perpendicular to the direction of the cells (passages); and a thickness of the cell wall having a shortest minor side, or a shortest minor base or a shortest inner side is identical to the basic cell wall thickness (Tc), by shortening the minor side of rectangle, or the inward minor base of inverse trapezoid or the inner side of spool one by one as said each cell wall is located more inwardly.

7. A ceramic honeycomb structure according to claim 1, wherein there is a relation shown by a formula:

$$1.10 \leq (Tr_1 \sim Tr_{3\text{-}20})/Tc \leq 2.50$$

between the basic cell wall thickness (Tc) and said each cell wall thickness ($Tr_1 \sim Tr_{3\text{-}20}$).

8. A ceramic honeycomb structure according to claim 1, wherein there is a relation shown by a formula:

$$1.20 \leq (Tr_1 \sim Tr_{3\text{-}20})/Tc \leq 1.60$$

between the basic cell wall thickness (Tc) and said each cell wall thickness ($Tr_1 \sim Tr_{3\text{-}20}$).

9. A ceramic honeycomb structure according to claim 1, wherein the cells have a sectional shape of a triangle or a higher polygon.

10. A ceramic honeycomb structure according to claim 1, wherein the honeycomb outer wall has a sectional shape of a circle, an ellipse, a trapezoid, a triangle, a tetragon, a hexagon or a special shape whose left and right are asymmetrical to each other.

11. A ceramic honeycomb structure according to claim 1, wherein the honeycomb outer wall has a diameter of 144 mm or more when it has a circular sectional shape and, when it has a sectional shape other than a circular sectional shape, it has a sectional area equal to when it has a circular sectional shape, and, there is the following relation $$1.10 \leq (Tr_1 \sim Tr_{10-40})/Tc \leq 3.00$$

between the basic cell wall thickness (Tc) and each cell wall thickness ($Tr_1 \sim Tr_{10-40}$) of cells existing within a first end cell from a third cell to a fortieth cell extending inwardly, taking the outermost peripheral cell as a first starting cell.

12. A ceramic honeycomb structure according to claim 1, wherein the honeycomb outer wall has a diameter of 144 mm or more when it has a circular sectional shape and, when it has other than a circular sectional shape, it has a sectional area equal to when it has a circular sectional shape, and, there is a following relation shown by a formula:

$$1.10 \leq (Tr_1 \sim Tr_{10-30})/Tc \leq 3.00$$

between the basic cell wall thickness (Tc) and each cell wall thickness ($Tr_1 \sim Tr_{10-30}$) of cells within a first starting end cell from a tenth cell to a thirtieth cells extending inwardly, taking the outermost peripheral cell as a first starting cell.

13. A ceramic honeycomb structure according to claim 1, wherein the cell walls and the honeycomb outer wall are made of at least one kind of materials selected from the group consisting of cordierite, alumina, mullite, silicon nitride, aluminum titanate (AT), zirconia and silicon carbide.

14. A ceramic honeycomb structure according to claim 1, which is used as a carrier for catalyst for automobile exhaust gas purification.

15. A ceramic honeycomb structure according to claim 1, which is assembled into a catalytic converter by loading a catalyst component on cell walls and holding honeycomb outer wall at outer surface.

16. A ceramic honeycomb structure according to claim 1, wherein corners of each cell are formed so as to have a radius of curvature of 1.2 mm or less.

17. A ceramic honeycomb structure according to claim 1, wherein each intersection between each outermost peripheral cell wall and the honeycomb outer wall is formed so as to have a radius of curvature of 1.2 mm or less.

18. A ceramic honeycomb structure according to claim 1, wherein there is cell deformation and, when a diameter of the honeycomb structure is 120 mm or less, a first or third end cell is any of a third cell to a fifth cell and, when a diameter is more than 120 mm, a first or a third end cell is any of a sixth cell to a twentieth cell.

19. A ceramic honeycomb structure according to claim 1, wherein there is provided with a corrugated cell wall having a corrugation in the direction of the cells (passages) between at least one pair of cells adjacent to each other, of the cells from the first starting cell to the first end cell or from the second starting cell to the second end cell or from the third starting cell to the third end cell.

* * * * *